US012662317B2

(12) United States Patent
Miller

(10) Patent No.: US 12,662,317 B2
(45) Date of Patent: Jun. 23, 2026

(54) ROBOTIC RECEIVING AND DISPERSEMENT SYSTEM

(71) Applicant: Kenneth C. Miller, Aptos, CA (US)

(72) Inventor: Kenneth C. Miller, Aptos, CA (US)

( * ) Notice: Subject to any disclaimer, the term of this patent is extended or adjusted under 35 U.S.C. 154(b) by 560 days.

(21) Appl. No.: 18/109,122

(22) Filed: Feb. 13, 2023

(65) Prior Publication Data

US 2023/0257201 A1 Aug. 17, 2023

Related U.S. Application Data

(60) Provisional application No. 63/309,714, filed on Feb. 14, 2022.

(51) Int. Cl.
| *B65G 1/137* | (2006.01) |
| *B65G 1/04* | (2006.01) |
| *B65G 67/02* | (2006.01) |

(52) U.S. Cl.
CPC ......... B65G 1/1378 (2013.01); B65G 1/0464 (2013.01); B65G 67/02 (2013.01)

(58) Field of Classification Search
CPC .... B65G 1/0464; B65G 1/1378; B65G 65/00; B65G 67/02; B64U 2101/60
See application file for complete search history.

(56) References Cited

U.S. PATENT DOCUMENTS

| 9,840,340 | B2 | 12/2017 | O'Toole |
| 10,457,421 | B2 | 10/2019 | O'Toole |
| 12,023,801 | B2 * | 7/2024 | Miller ................. B65G 1/0464 |
| 12,291,333 | B1 * | 5/2025 | Theobald ............... B60P 3/007 |
| 2017/0355077 | A1 | 12/2017 | Miller |
| 2018/0035625 | A1 * | 2/2018 | Lindbo ................. A62C 35/68 |
| 2021/0001475 | A1 * | 1/2021 | Miller ........................ B25J 5/02 |
| 2021/0132625 | A1 | 5/2021 | Gillett |

(Continued)

FOREIGN PATENT DOCUMENTS

| EP | 3321179 A1 | 5/2018 |
| WO | 2021216397 A1 | 10/2021 |
| WO | 2021216407 A1 | 10/2021 |

OTHER PUBLICATIONS

Int'l Search Report for PCT/US2023/012938, issued Jun. 16, 2023.

*Primary Examiner* — Joseph C Rodriguez
(74) *Attorney, Agent, or Firm* — MaxGoLaw PLLC

(57) ABSTRACT

A receiving and disbursement system is provided for the receipt of items from fulfillment centers, retail locations, or homes to a designated location, securing the delivered items from theft, or inserting the delivered items directly into a building or building automation system. The receiving and disbursement system is further able to reverse the process in order to automatically retrieve items back from the delivery location to return items to retail locations, homes, businesses, fulfillment or recycling centers for delivery, re-filling, recycling and/or disposal. A system of delivery vehicle interfaces, delivery containers, item trays, and docking stations to facilitate the movement of items from one location to another location and back to the same or other designated location. Locations may include industrial, agricultural, business, government, waste disposal, homes, garages, carports, barns, greenhouses, or inside a home. The system further utilizes autonomous road worthy vehicles, sidewalk vehicles, and drones.

20 Claims, 33 Drawing Sheets

(56)  References Cited

U.S. PATENT DOCUMENTS

| 2021/0261336 A1* | 8/2021 | Ingram-Tedd ....... B65G 1/0464 |
| 2021/0309363 A1 | 10/2021 | Zhou |
| 2021/0394660 A1 | 12/2021 | Crawford, Jr. et al. |
| 2021/0394930 A1 | 12/2021 | O'Toole |
| 2021/0395011 A1* | 12/2021 | Crawford, Jr ....... G06Q 10/087 |
| 2022/0055770 A1 | 2/2022 | O'Toole |
| 2022/0153523 A1* | 5/2022 | Bastian, II ........... B25J 15/0616 |
| 2023/0363562 A1* | 11/2023 | O'Toole .................... A61L 2/10 |
| 2023/0410028 A1* | 12/2023 | O'Toole .................... A61L 2/10 |

* cited by examiner

48

48

100

110

112

114

124

129

120

122

126

128

121

130

144

140

146

142

148

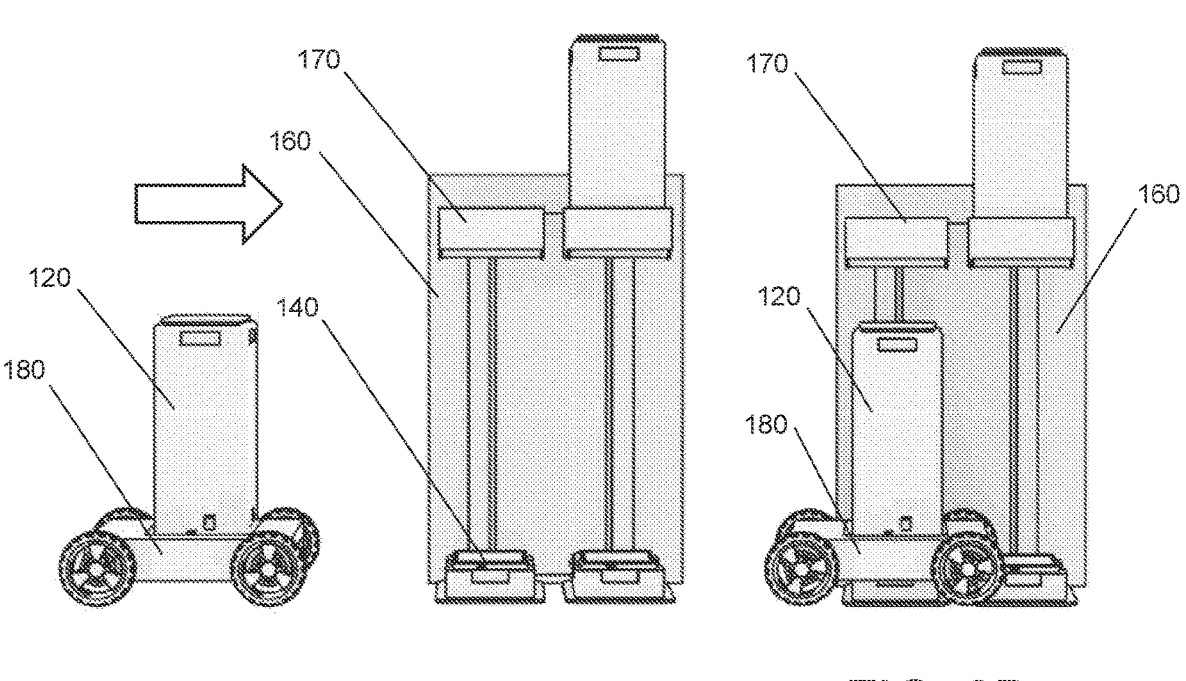
FIG. 8A            FIG. 8B
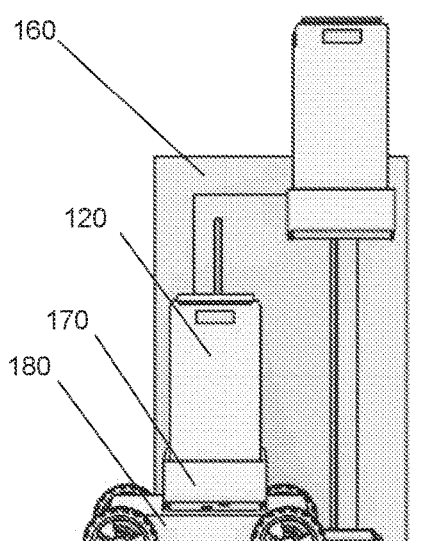
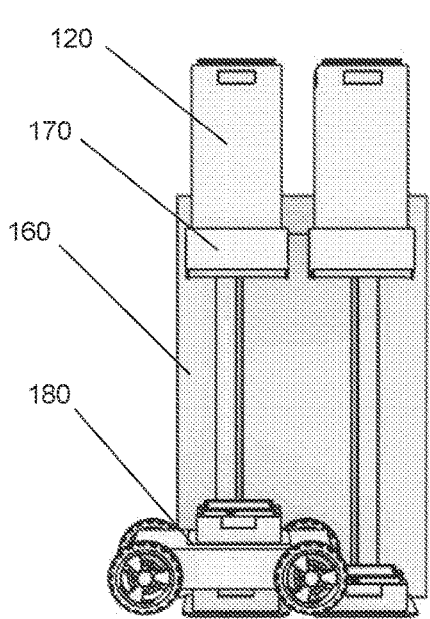
FIG. 8C            FIG. 8D

ROBOTIC RECEIVING AND DISPERSEMENT SYSTEM

RELATED APPLICATIONS

This application is a non-provisional application that claims priority benefit of U.S. Provisional Application Ser. No. 63/309,714 filed Feb. 14, 2022; the contents of which are hereby incorporated by reference.

FIELD OF THE INVENTION

The present invention in general relates to an automated system and in particular for a forward and reverse logistics system that can integrate with a ceiling mounted interior space automated construction, maintenance, storage, logistics, or production system configured with robots and other automation.

BACKGROUND OF THE INVENTION

Moving typical wheeled, tracked, or legged robots around the interior of buildings and from room to room in order to perform household tasks such as setting tables, clearing dishes, washing dishes, putting away dishes, dusting, vacuuming, collecting clothing, washing clothing, cooking, painting, sanding, general maintenance, etc. requires that the robots to be capable of moving around on the floor which may have many obstacles such as thresholds, carpets, steps, stairs, toys, rugs, people, pets, tables, chairs, furniture, etc. that could interfere with the robot's ability to navigate the space. U.S. Pat. No. 10,780,576 and pending PCT Application PCT/US2021/063449 both of Applicant, and included herein by reference in their entirety, address some of the problems with current robotic systems including not being able to reach above, over and around lamps, furniture, etc. as well as accessing the ceiling. In addition, U.S. Pat. No. 10,780,576 and pending PCT Application PCT/US2021/063449 provide a method for robots to easily transport bins, trays, vacuum systems, washing systems, etc. from room to room in a building while simultaneously performing the aforementioned tasks, as well as a means to provide power to home robotic systems without the use of on-board batteries or cords/tethers. U.S. Pat. No. 10,780,576 and pending PCT Application PCT/US2021/063449 also provide a solution for ceiling mounted automation systems to move robots from room to room due to the header above doorways.

Additionally, as population densities increase globally, living spaces are expected to shrink. Much of the required space in a living setting is devoted to storage of items including recyclable waste. The ability to access items and appliances without having devoted floor space for such storage would greatly facilitate shrinking personal living space.

Furthermore, as the use of drone technology becomes more widespread, new uses for drones are being developed. By way of non-limiting example, in the commercial sector companies are exploring the use of drones to deliver mail, food, and medical supplies to homes. A variety of factors make such use of drone technology difficult if not impossible. Various home designs often make access to the front porch or other safe delivery point via drone difficult or impossible. Drones are unable to access interior portions of many apartment buildings thereby precluding front-door delivery. In the case of medicine delivery, even if a front porch or other safe delivery point is accessible, delivering medication in such an unsecured fashion is not ideal for a many reasons including an increased risk of theft. The ability to securely deliver items to an area of a building more easily accessible to a drone, for example a receptacle on a rooftop also accessible via the interior of the building, or in a covered porch or garage area would greatly facilitate the effective use of drones in streams of commerce.

Currently, robotic delivery systems have no standard delivery container and/or method for delivering items from fulfillment centers or retail locations to a designated location, securing the items from theft, or inserting the items directly into a building or building automation system. There is also no current method to reverse the process in order to automatically retrieve and return items back from the location to retail locations, homes, businesses, fulfillment centers for return orders, or recycling centers for delivery, re-filling, recycling and/or disposal.

Thus, there exists a need for an improved robotic automation system for indoor, outdoor, and covered spaces that accept delivery, securely store, manipulate, retrieve, and return items in an integrated system.

SUMMARY

A robotic receiving and disbursement system is provided for the receipt of items from fulfillment centers, retail locations, or homes to a designated location, securing the delivered items from theft, or inserting the delivered items directly into a building or building automation system. The receiving and disbursement system is further able to reverse the process in order to automatically retrieve items back from the delivery location to return items to retail locations, homes, businesses, fulfillment or recycling centers for delivery, re-filling, recycling and/or disposal. A system of delivery vehicle interfaces, delivery containers, item trays, and docking stations to facilitate the movement of items from one location to another location and back to the same or other designated locations as provided. Locations may include industrial, agricultural, business, government, waste disposal, homes, garages, carports, barns, greenhouses, or inside a home (with or without an automation system), etc. The system further utilizes autonomous road worthy vehicles, sidewalk based vehicles as shuttles, and drones.

A process is provided for the automated secure removal or vice versa for delivery of one or more items in an indoor room area to an outdoor location. The process includes storing the one or more items in a system having a rail array secured to a ceiling, a gantry, a drive mechanism coupled to the gantry for transit of the gantry in an area of the rail array, a platform suspended from the gantry, a controller with a human or computer user interface for selectively moving the gantry, and a plurality of storage modules located above the rail array, each of the plurality of storage modules having a volume for storage of an item or tray and positioned within cells of the rail array. The process further includes requesting an item from the one or more items via the user interface, allowing sufficient time for the gantry to translate to one of the plurality of the storage modules, the storage module therein containing the requested item, tray or module, retrieving the item, tray or module containing the item, and accessing the item, tray or module; lowering the item, tray, or module; and moving the item, tray, or module to a user selected delivery point for retrieval.

A business method is provided by which goods are delivered and autonomously stored for financial remuneration. A further business method is provided in which underutilized storage modules are leased and accessed for subsequent deliveries according to the present invention and also involving financial remuneration.

BRIEF DESCRIPTION OF THE DRAWINGS

The present invention is further detailed with respect to the following figures that depict various aspects of the present invention.

FIGS. 8A-8H are a series of sequential close up views of the operation of the automated transfer station as previously shown in FIGS. 6A-6X and 7A-7R in accordance with embodiments of the invention;

DESCRIPTION OF THE INVENTION

Figure 1A:
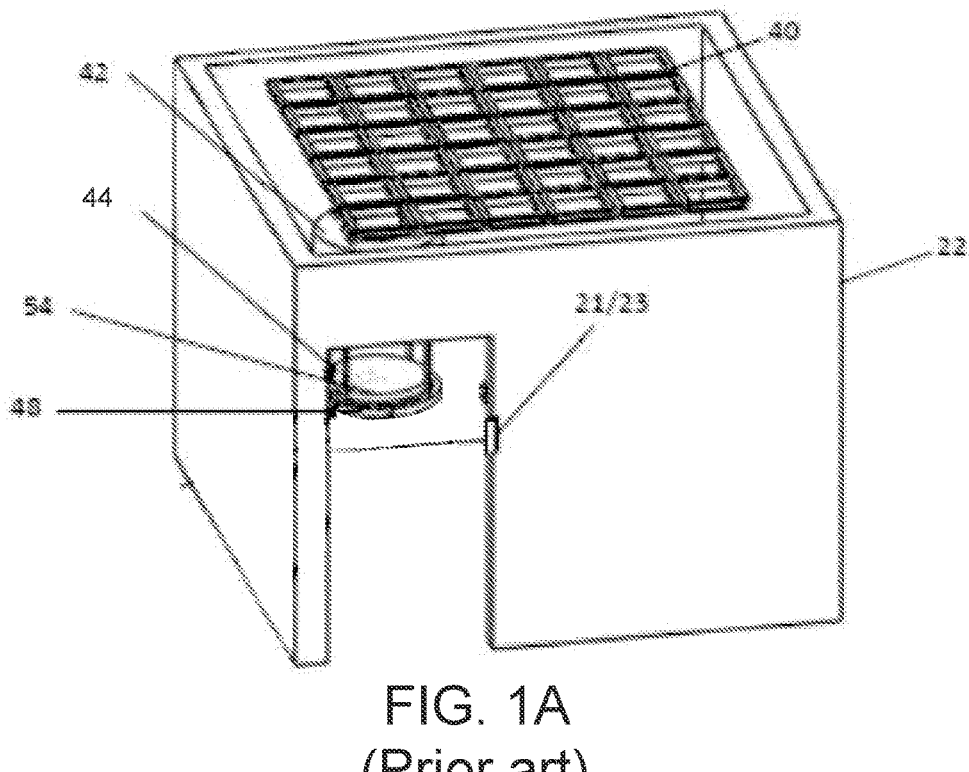
FIGS. 1A and 1B illustrate a prior art ceiling mounted X-Y rail systems in a room or enclosure used in accordance with certain embodiments of the invention, with a magnified view in FIG. 1B showing the rails and gantry.

The present invention has utility as a robotic receiving and disbursement system that provides for the receipt of items from fulfillment centers, retail locations, or homes to a designated location, securing the delivered items from theft, or inserting the delivered items directly into a building or building automation system. Embodiments of the inventive robotic receiving and disbursement system are further able to reverse the process in order to automatically retrieve items back from the delivery location to return items to retail locations, homes, businesses, fulfillment or recycling centers for delivery, re-filling, recycling and/or disposal. Embodiments of the invention utilize a system of delivery vehicle interfaces, delivery containers, item trays, and docking stations to facilitate the movement of items from one location to another location and back to the same or other designated location. Locations may include industrial, agricultural, business, government, waste disposal, homes, garages, carports, barns, greenhouses, or inside a home (with or without an automation system), etc. The system further utilizes autonomous road worthy vehicles, sidewalk vehicles as shuttles, and drones.

Embodiments of the inventive robotic receiving and disbursement system include four primary components:

Delivery/transfer vehicle(s) interface: for ground-based robots and vehicles, airborne robots (drones), elevators, and/or humans Delivery container(s): to support and protect item trays and items from weather and theft Item tray(s): to support, protect and facilitate automated picking/placing items Docking station(s): to secure containers, trays, and items from weather, damage, and theft In specific inventive embodiments a ceiling mounted system as disclosed in U.S. Pat. No. 10,780,576 and pending PCT Application PCT/US2021/063449 for automated construction, maintenance, storage, warehousing logistics, bar, restaurant, or production is used to implement the inventive robotic receiving and disbursement system in indoor or outdoor spaces including covered spaces configured with robots and other automation. The ceiling defining a portion of an interior room or a trellis that is either indoors or outdoors. Through resort to innovative support systems including an overhead gantry system, cables, or an X-Y rail grid, a suspended platform is traversed throughout the system area. In specific inventive embodiments a ceiling mounted system as disclosed in U.S. Pat. No. 10,780,576 and pending PCT Application PCT/US2021/063449 for automated construction, maintenance, storage, warehousing logistics, bar, restaurant, or production is used to implement the inventive receiving and disbursement system in indoor or outdoor spaces including a covered or interior spaces configured with robots and other automation. The ceiling defining a portion of an interior room or a trellis that is either indoors or outdoors. Through resort to innovative support systems including an overhead gantry system, cables, or an X-Y rail grid, a suspended platform is traversed throughout the system area. It should be appreciated that a module according to the present invention provides volume in which items are stored, an automation sub-system that performs a function or delivers items to a user or a combination of both storage and function. The details of which are provided below. It should further be appreciated that modules are operative independent of robotic arms in some inventive embodiments.

Figure 1B:
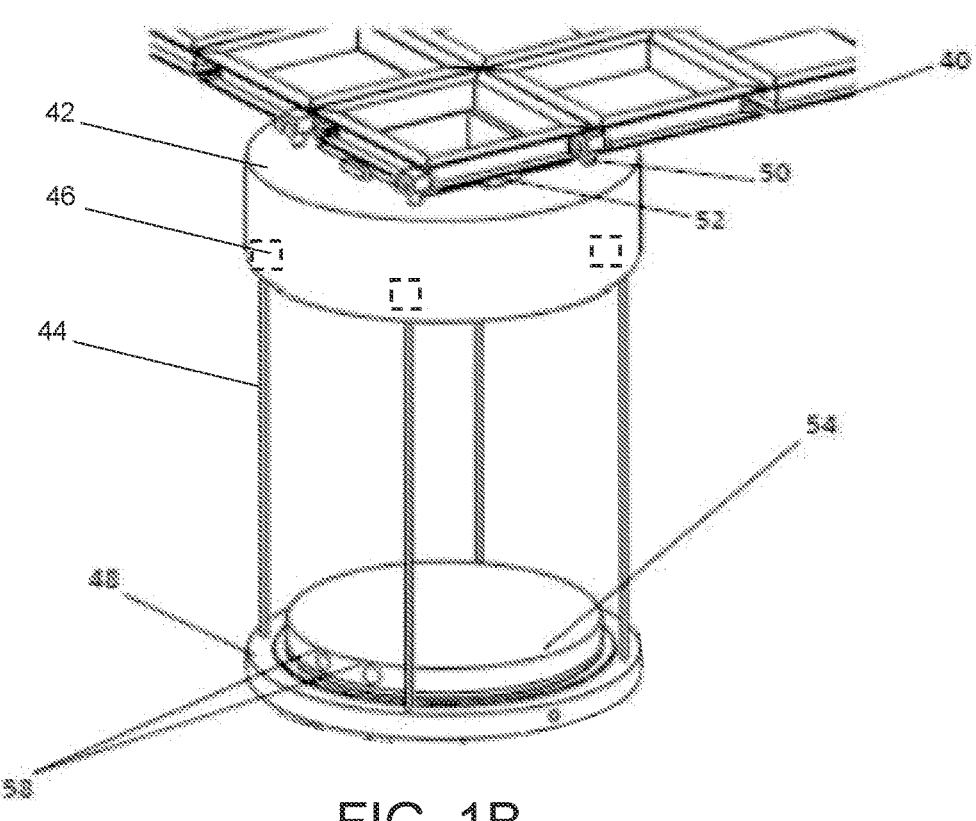

FIGS. 1A and 1B illustrate a ceiling mounted X-Y rail system 40 in a room or enclosure 22 that supports a motorized gantry 42 which translates on the X-Y rails 40 where like numerals have the meaning ascribed to thereto with respect to the aforementioned drawings. The X-Y rails 40 may supply electrical power to gantry 42. Gantry 42 contains three or more motorized lifts or winches 46 that drive (extend and retract) cables 44 which support, raise, lower, and tilt a platform 48. It is appreciated that differential winch 46 operation causes the suspended platform 48 to tilt, an orientation that can promote loading and unloading thereof. Gantry 42 also contains four drive wheel modules 50 and four lifts 52 which work in concert to move gantry 42 in orthogonal directions (X-Y directions) on the X-Y rails 40. Gantry 42 may supply electrical power to platform 48. Platform 48 supports a motorized rotating platform 54. Platform 48 may supply electrical power to rotating platform 54. In specific embodiments rotating platform 54 may support one or more cameras 58.

Automating the storing and retrieving of items in a building requires a location to store the items and a system to automatically retrieve and replace the items. Most buildings do not have storage space that is conveniently located for access by automated systems (robots, automation, etc.). The storage spaces that are available (drawers, cupboards, cabinets, closets, shelves, etc.) are usually a cluttered mess and not organized for automation. If people have access to these storage areas, they may become unusable for automatic retrieval because the items will be moved around without the knowledge of the automated system.

Figure 2:
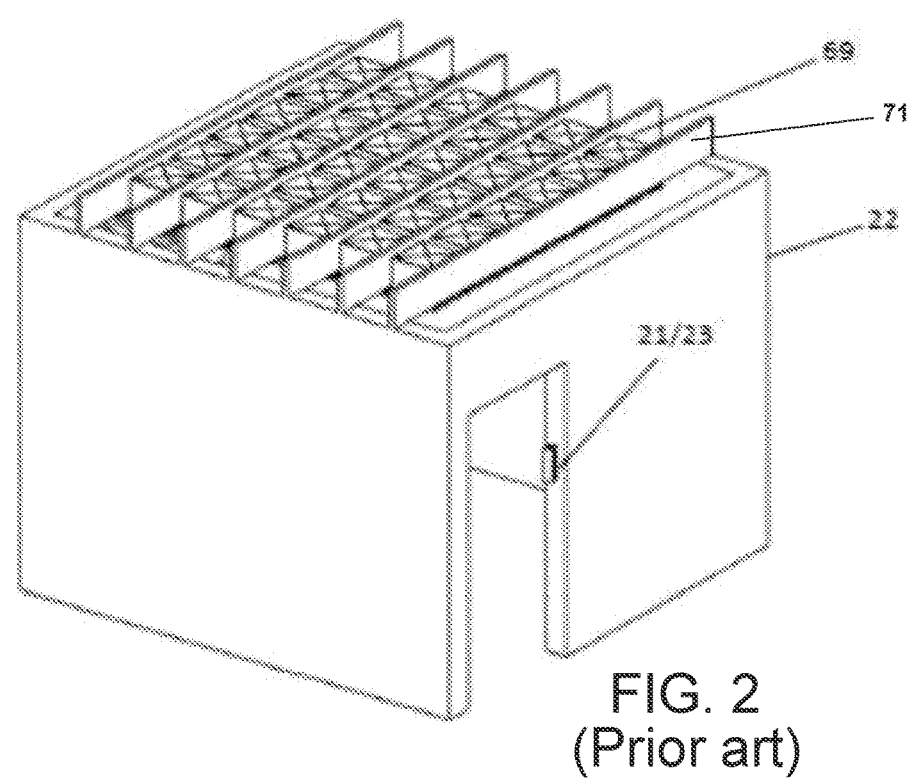
FIG. 2 is a prior art perspective view of a ceiling storage modules employed in embodiments of the invention.
Figure 3:
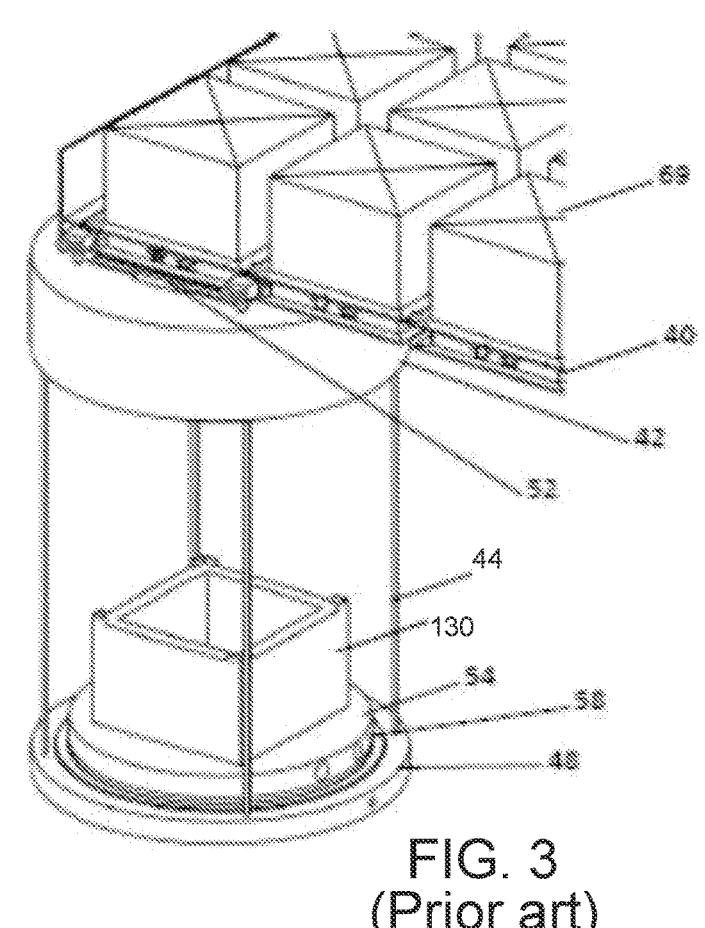
FIG. 3 is a prior art perspective view of a platform suspended below the ceiling units of FIG. 2 with a storage module insert resting on the platform to provide access to the storage unit volume.

FIGS. 2 and 3 illustrate prior art embodiments used in the implementation of the present invention with storage modules 69 present above the X-Y rails 40 where like numerals have the meaning ascribed thereto with respect to the aforementioned drawings. An array of storage modules 69 are provided that are ceiling mounted. This is depicted with interspersed ceiling joists 71 in FIG. 2. This is accomplished by mounted to, for example, sheet-rock, ceiling joists, or drop ceiling systems) X-Y rails 40 in each room 22 which support a motorized gantry 42 which can translate orthogonally on the X-Y rails 40. The X-Y rails 40 may supply electrical power to gantry 42. In some inventive embodiments, at least two of the item trays 130 are stacked on one another forming a stack 76. This is depicted in in FIGS. 4A and 4B.

As a result, the volume above, between and below the X-Y rails 40, as well as the space between the ceiling joists 71 is used to contain modules 69 and item trays 130 in a controlled storage location for automated retrieval and replacement, where the modules 69 illustratively have within them item trays 130, storage units, storage bins, storage shelves, tables, robots, games, displays, refrigerators, freezers, ovens, microwaves, humidors, fire extinguishers, wine racks, lights, cameras, speakers, audio and video components, displays, smoke detectors/alarms, sensors, electronic equipment, dishwashers, vacuum cleaners, air purifying systems, air heating and cooling systems, charging stations, dispensing units, or a combination thereof. It is appreciated that the rails can form a variety of shapes and sizes to accommodate storage modules 69 that are of a variety of shapes and sizes such as cuboidal or hemispherical volumes. It is further appreciated that the rails can also accommodate a variety of configurations of the storage modules 69. The storage modules 69 can be accessed robotically via the platform 48, or manually. It is further appreciated that in some inventive embodiments, a particular item tray 130 that is part of a stack of item trays 76 is selectively retrieved and delivered to a user, or an item accessed therefrom is delivered to a user.

A controller 21 provides a human user interface 23 that is a display, touch screen, auditory, or a joystick and receives user input as to the desired items from storage, the location of delivery and the scheduling of delivery. The controller 21 has access to a database inventory of items stored in the storage modules 69, or to be stored in the storage modules 69. The controller 21 then instructs the movement of the gantry 42 to retrieve or store items.

Figure 4A:
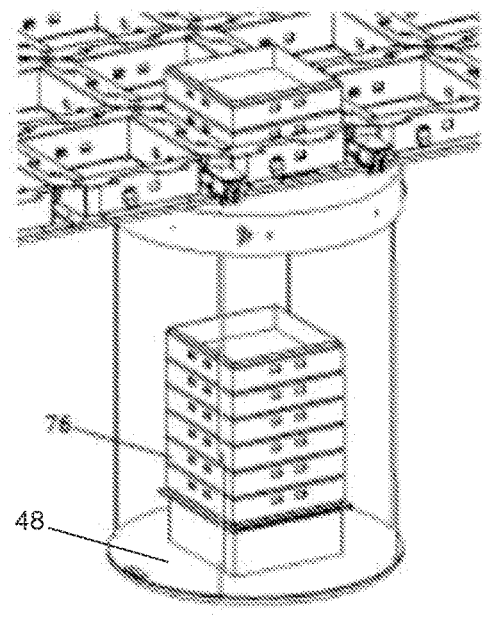
FIGS. 4A and 4B are prior art perspective views of a retrieved stack of a plurality of storage trays being lowered on a platform suspended by the gantry used in accordance with certain embodiments of the invention.
Figure 4B:
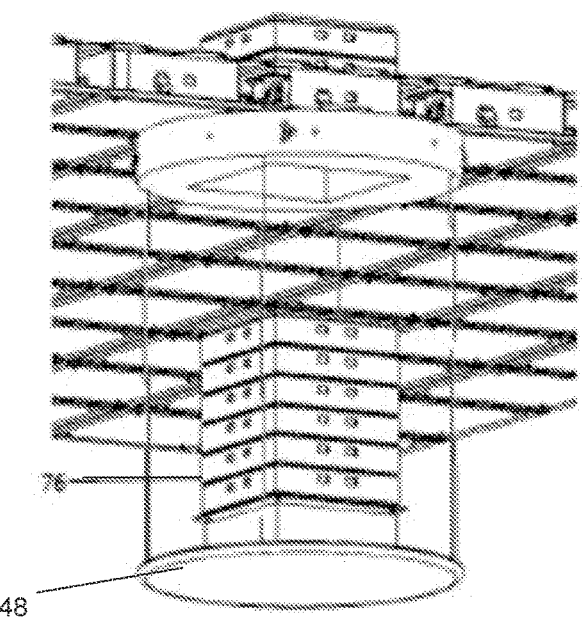

FIGS. 4A and 4B illustrate an embodiment of the present invention in which a stack of item trays 76 is present on platform 48. As shown in FIGS. 6C-6J a stack of item trays 76 represent separate containers of sorted recyclables of glass, metal, and paper.

It is appreciated that a variety of sensors, video displays, speakers and microphones on the X-Y rails, translation platforms, storage platforms, cosmetic panels or a combination thereof can be incorporated. As a result, a telepresence is created that allows for more complex control and operational feedback. It is also appreciated that any platform, tray or module detailed herein may contain batteries to serve as a main or backup power source for an inventive system, module or stored item. It is further appreciated that a controller 21 with a human or computer user interface 23 is provided to selectively move the gantry, and the plurality of item trays 130 that are in storage modules 69 located above the rail array. In specific embodiments the human or computer user interface 23 is a display, touch screen tablet, auditory, smart phone, a joystick, or a combination thereof.

Figure 5A:
FIG. 5A is an exploded perspective view of an inventive delivery system according to certain embodiments of the present invention.

As shown in FIG. 5A, embodiments of the present invention additionally provide a system 100 of delivery vehicle interfaces 110, delivery containers 120, item trays 130, and docking stations 140 to facilitate movement of items from one location to another location while securing such items from theft. Unlike existing systems, the inventive system 100 provides a method of reversing the processes in order to automatically retrieve items back from the location of delivery. According to certain inventive embodiments, the items are delivered by inserting directly into a building or building automation system. According to certain inventive embodiments, the locations include retail locations, businesses, fulfilment centers, recycling centers, industrial locations, agricultural locations, government locations, waste disposal locations, homes, garages, carports, barns, greenhouses, parks, public places, etc. According to certain inventive embodiments, a delivery vehicle interface 110 of the inventive system 100 includes attachment points 112 for attaching the interface 110 to a robotic shuttle vehicle 180 (shown in FIGS. 6S-6X and 7A-7E, 8A-8H, 10A-10F, 11A-11F, and 13A-13F) or a transfer station 160 and delivery container latches 114 for retaining delivery containers 120 during transport. According to certain inventive embodiments, the delivery vehicle interfaces 110 facilitate bottom and/or top loading and include optional actuators to release item tray latches. According to certain inventive embodiments, a delivery container 120 of the inventive system 100 is an enclosure 122 with an open bottom and sloped surfaces 124 to facilitate water runoff. The containers also include handles 126 for human or robotic grasping, latches 128 to retain item trays 130, compliant latch covers for environmental isolation, and interlocking features 129 for stacking multiple containers 120. According to certain inventive embodiments, an item tray 130 of the inventive system are formed having standard sizes so that they trays are interchangeable. The shape and latching features of the item trays 130 are detailed in U.S. Pat. No. 10,780,576, which is hereby incorporated by reference in its entirety. According to certain inventive embodiments, a docking station 140 of the inventive system 100 includes mounting features 142 to secure to the ground, buildings, and/or vehicles. The docking station 140 also includes a locating interface/riser 144 for a container 120. Releasable latches 146 secure the containers 120 to the docking station 140 and an interface/riser 148 also lifts the item trays 130 off the latches 146 to facilitate unlatching and a secondary interface/riser 148 enables the delivery vehicle interface 110 to latch below the bottom of the container 120.

Figure 5B:
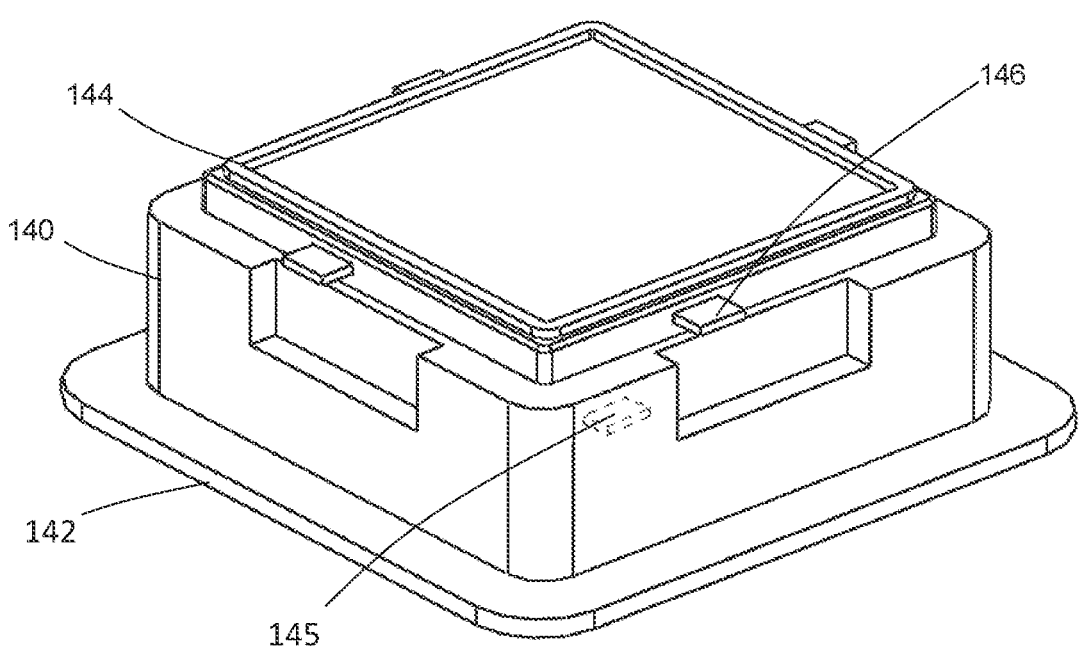
FIGS. 5B and 5C are detailed perspective views of the docking station of FIG. 5A and the locking mechanism, respectively.
Figure 5C:
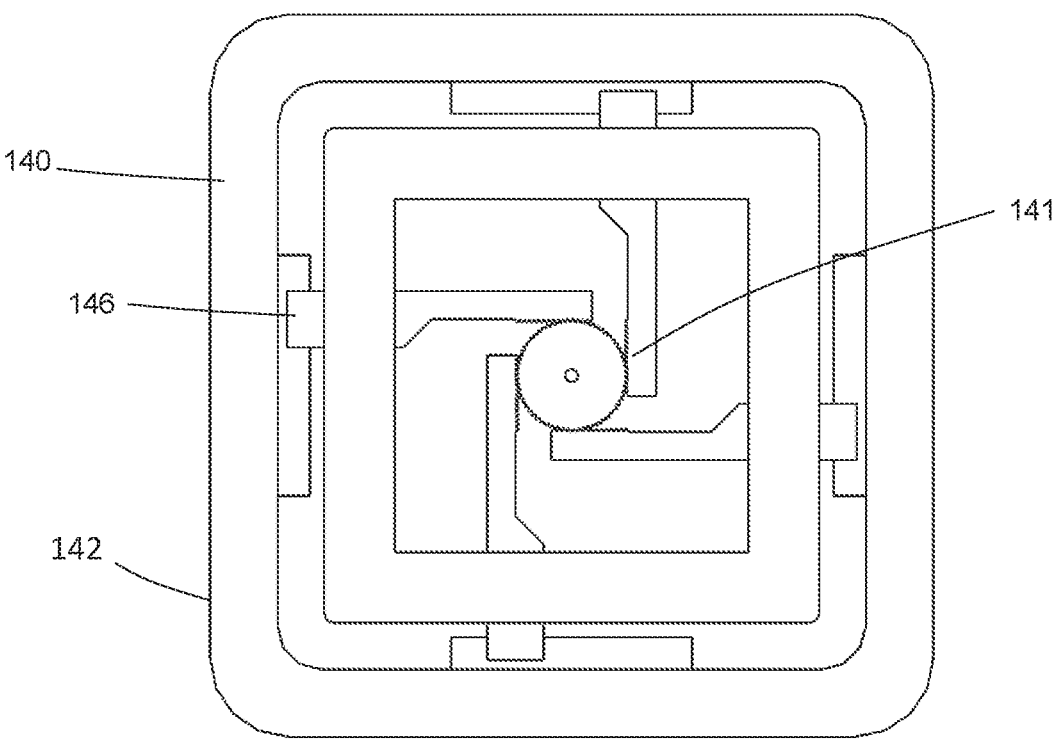

FIGS. 5B and 5C are detailed perspective views of the docking station 140 of FIG. 5A and the locking mechanism 141, respectively. The latches 146 actuate at the same time via mechanism 141 as shown in the sectional view of FIG. 5C to engage or disengage from slots 121 in the container 120. The locating interface/riser 144 lifts item trays 130 off the latches 146 to enable no load unlatching. RFID tag reader 145 or similar system identifies containers 120 loaded on to the docking station 140.

Figure 5D:
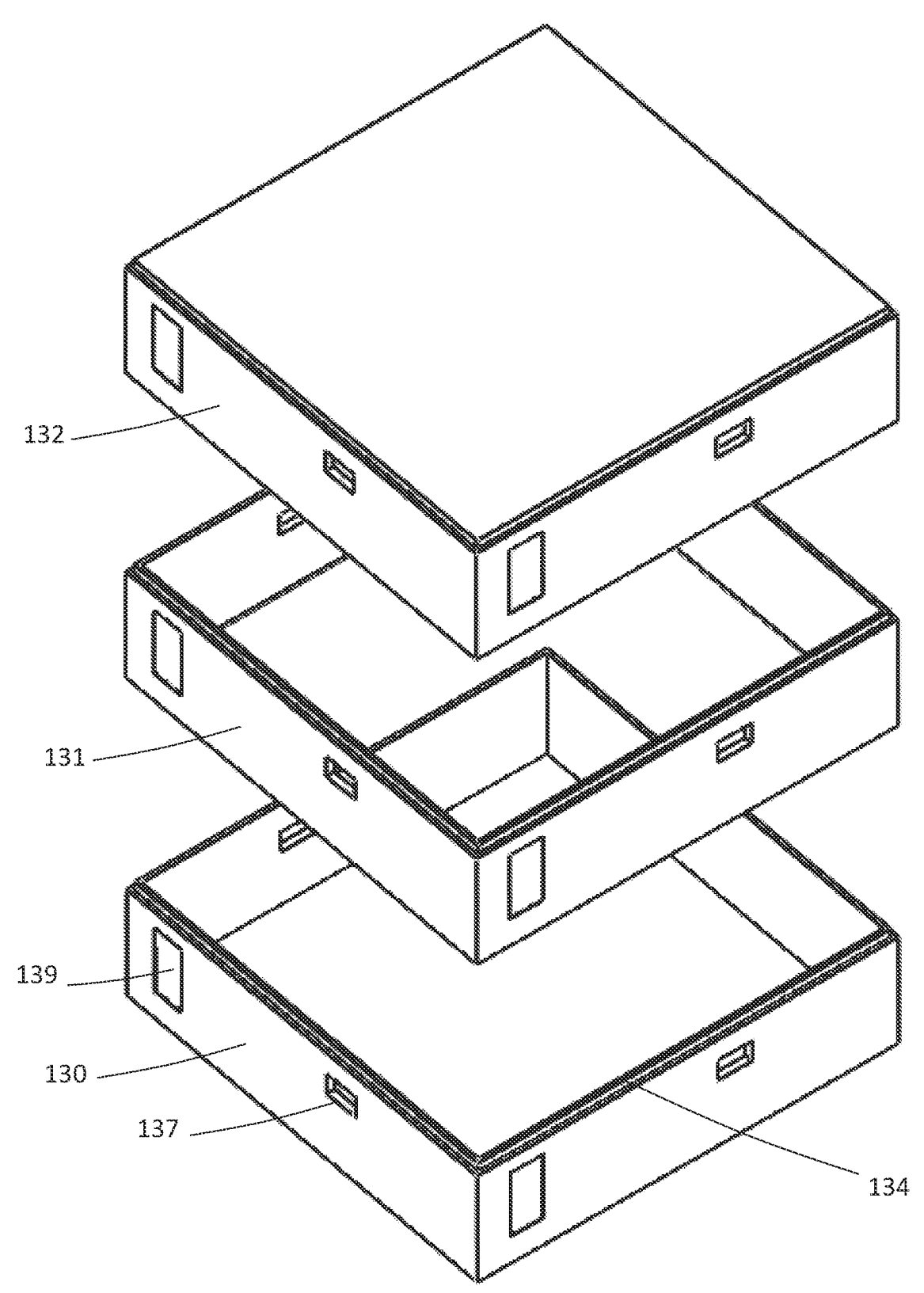
FIG. 5D is a detailed view of the item tray of FIG. 5A showing expansion options in accordance with embodiments of the invention.
Figure 5E:
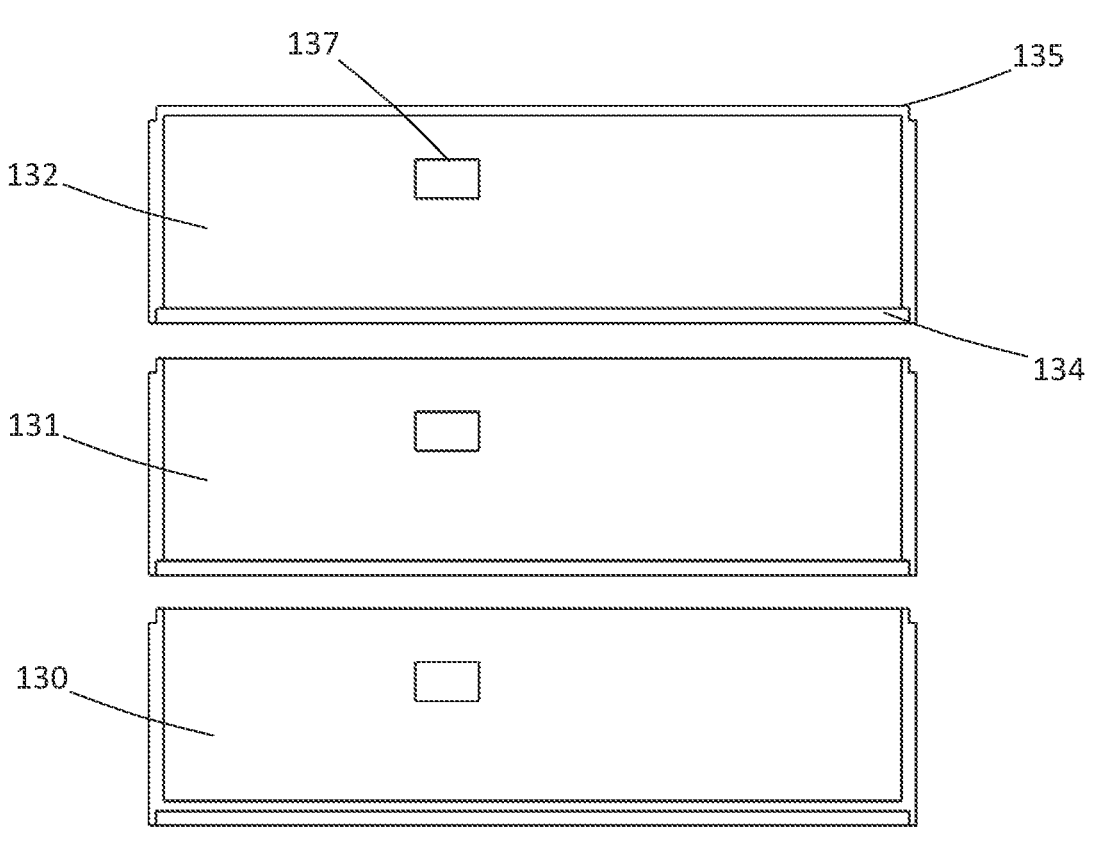
FIG. 5E is an exploded cross sectional sideview of FIG. 5D that illustrates the interlocking features between the item tray parts in accordance with embodiments of the invention.
Figure 5F:
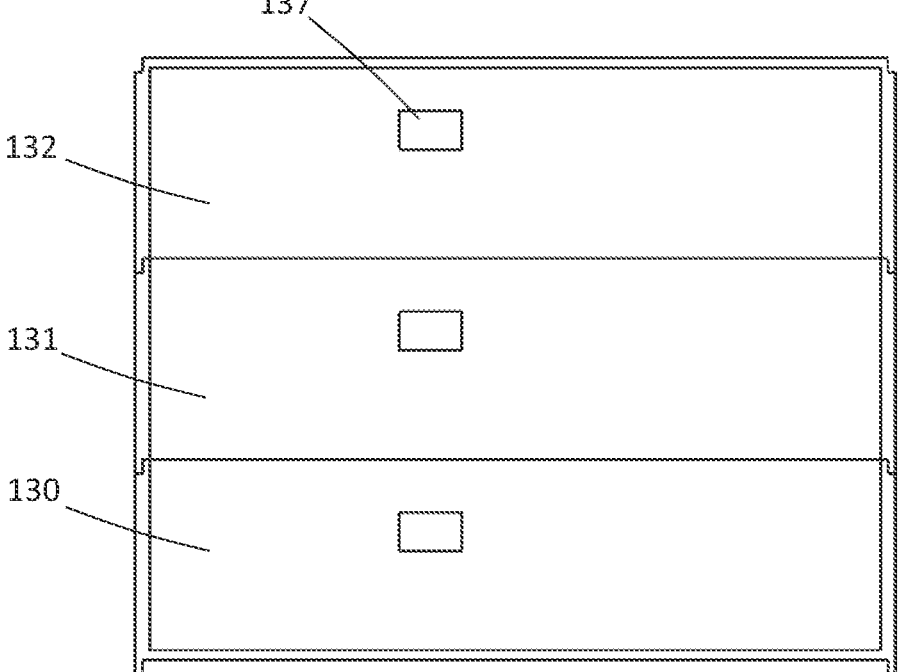
FIG. 5F is a cross sectional sideview of the item tray parts stacked and fully engaged in accordance with embodiments of the invention.

FIG. 5D is a detailed view of the item tray 130 of FIG. 5A showing expansion options that include a bottom tray 130, a spacer tray 131, and a cover tray 132. The tray parts stack on each other using complementary edge features including a male lifted perimeter upper rim 134, and a receiving female perimeter lower rim 135 as shown in FIG. 5E. Tray size (height) can be automatically configured by adding or removing the spacer trays 131. Cover tray 132 is optional because bottom trays 130 can act as the cover for the tray(s) below. Each of the trays may have an identification indicia label 139 illustratively including a quick response (QR) code, barcode, or other machine readable identification. In addition, a radio frequency identification (RFID) tag may be incorporated. Receptacle slots 137 provide latching features for ceiling storage modules 69, delivery vehicle interfaces 110, lift arms 170, stack clamps 172, or delivery containers 120. FIG. 5E is an exploded cross sectional sideview of FIG. 5D that illustrates the interlocking features (134, 135) between the item tray parts (130, 131, 132). FIG. 5F is a cross sectional sideview of the item tray parts (130, 131, 132) stacked and fully engaged. It should be noted that a tray may consist of only the bottom tray 130.

Figure 5G:
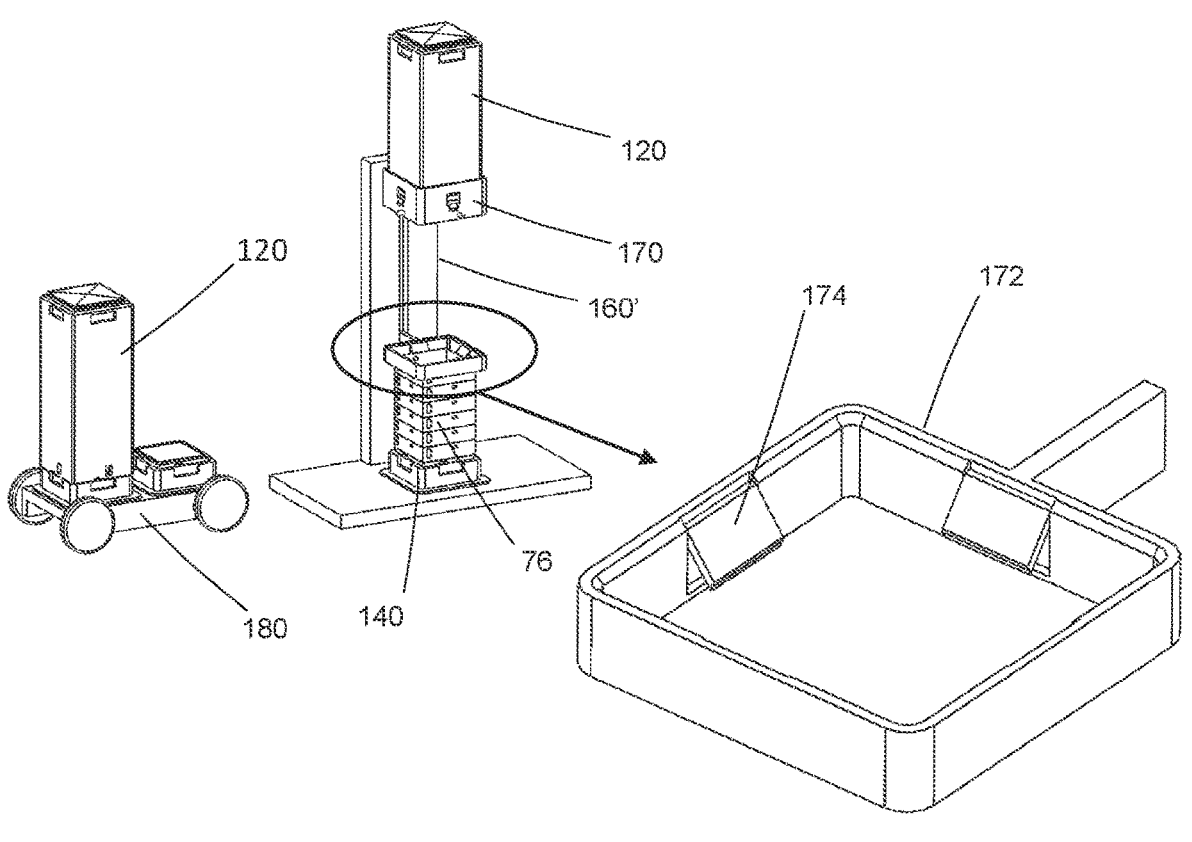
FIG. 5G illustrates a tray stack clamp used at a public transfer station to secure a stack of trays in accordance with embodiments of the invention.
Figure 5H:
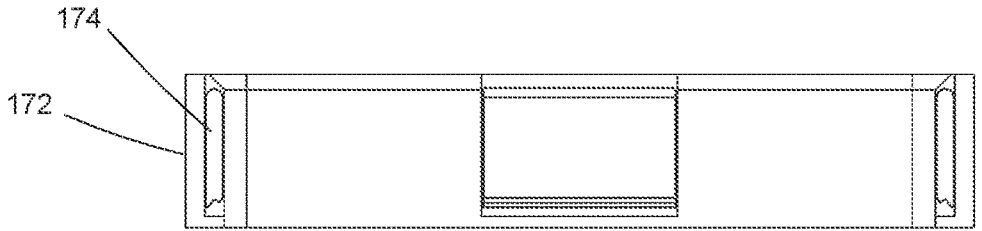
FIGS. 5H and 5I are cross sectional side views of a tray with clamps from the tray stack clamp disengaged and engaged with a tray (not shown for visual clarity), respectively.
Figure 5I:
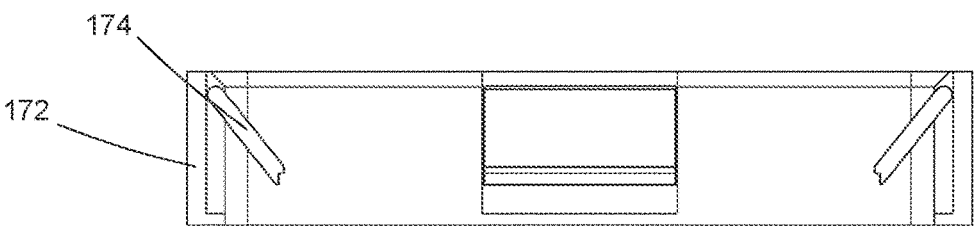
Figure 5J:
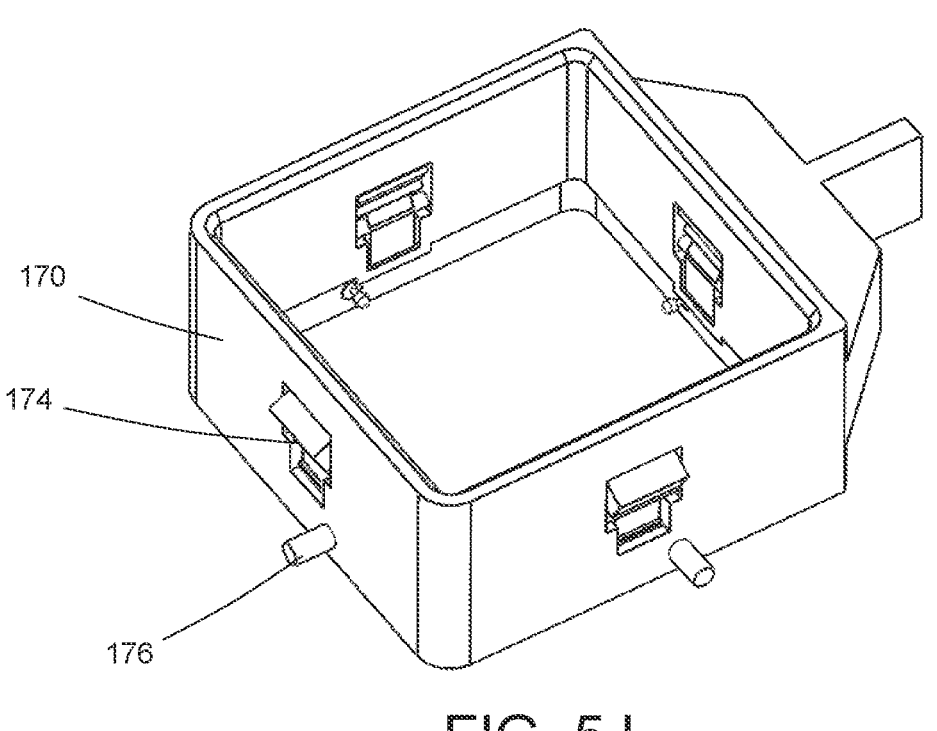
FIG. 5J illustrates a lift arm used on a transfer station and also for an autonomous vehicle to grab and lift containers in accordance with embodiments of the invention.
Figure 5K:
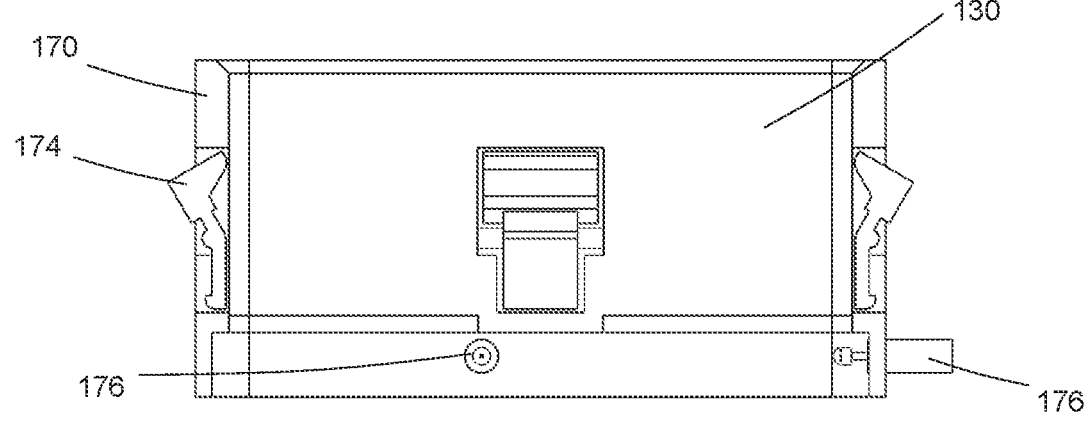
FIGS. 5K and 5L are cross sectional side views of a container with clamps from the lift arm disengaged and engaged with a tray, respectively.
Figure 5L:
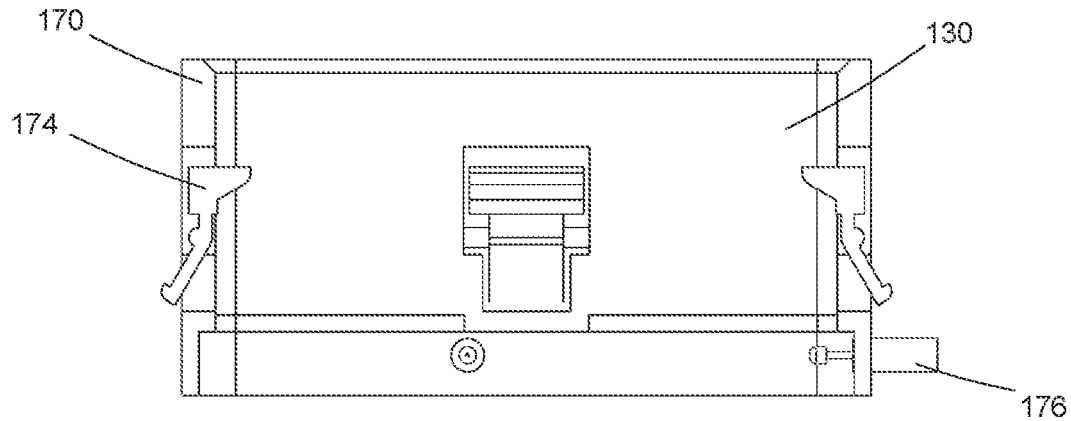

FIG. 5G illustrates a tray stack clamp 172 used at a public transfer station 160' to secure a stack of trays 76. The container 120 is lifted by lift arm 170 to leave the stack of trays 76 on stationary docking station 140. Robotic shuttle vehicle 180 or humans either delivers or retrieves containers 120 of trays 130 from the public transfer station 160'. As will be shown in greater detail the robotic shuttle vehicle 180 is an off-street vehicle that shuttles between an autonomous vehicle that is road worthy, an aerial drone and/or a transfer station. The tray stack clamp 172 adjusts up and down along the vertical of the transfer station 160'. The tray stack clamp 172 has latches 174 that lock into the trays 130. The tray stack clamp 172 is only needed for public transfer stations 160' to keep people from tampering with the stack of trays 76, while providing access only to the designated tray by holding down all the trays including the designated tray on top of the stack 76. FIGS. 5H and 5I are cross sectional side views of a tray with clamps 174 from the tray stack clamp 172 disengaged and engaged with a tray 130 (not shown), respectively;

FIG. 5J illustrates a lift arm 170 used on a transfer station 160. It is noted that a variation of lift arm 170 is an extendable lift arm 200 for use on an autonomous self-driving vehicle 190 as shown in FIGS. 9, 10A-10F, and 11A-11F to grab and lift containers 120 and trays 130 and either remove them from the autonomous vehicle 190 and place them on a robotic shuttle vehicle 180 or remove them from the robotic shuttle vehicle 180 and load them on the autonomous self-driving vehicle 190. The lift arm has latches 174 that engage and disengage with the container 120, and actuators 176 that engage and disengage with the container tray latches 128. FIGS. 5K and 5L are cross sectional side views of lift arm 170 with latches 174 disengaged and engaged with a container 130 (not shown), and actuators 176 disengaged and engaged with container tray latches 128 (not shown).

Figure 5M:
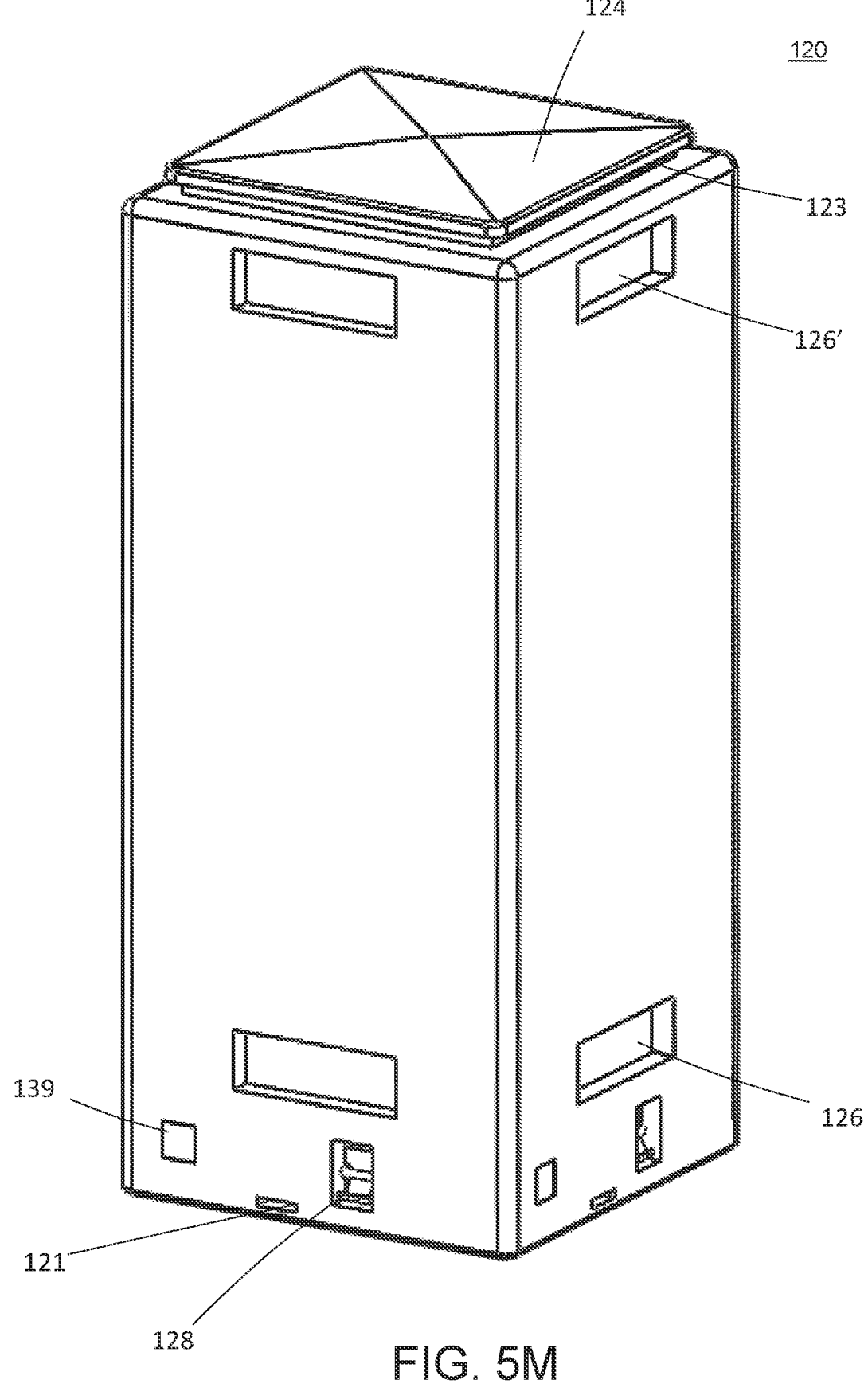
FIG. 5M is a detailed perspective view of the container of FIG. 5A.

FIG. 5M is a detailed perspective view of a container 120 of FIG. 5A. The slots 121 engage with the latches 146 of the docking station 140. The container 120 also includes handles 126 and 126' for human or robotic grasping, and tray latches 128, which may be spring loaded, to retain item trays 130. The top portion of the container 120 has sloped surfaces 124 to facilitate water runoff. A recess 123 along the outer perimeter of the sloped surfaces 124 may also be used as an attachment point, as well as for stacking of containers 120. Indicia or identification (ID) tag 139 may be representative of QR, barcode, RFID, etc. A set of compliant latch covers may be provided on the containers 120 for environmental isolation of the latches.

Figure 5N:
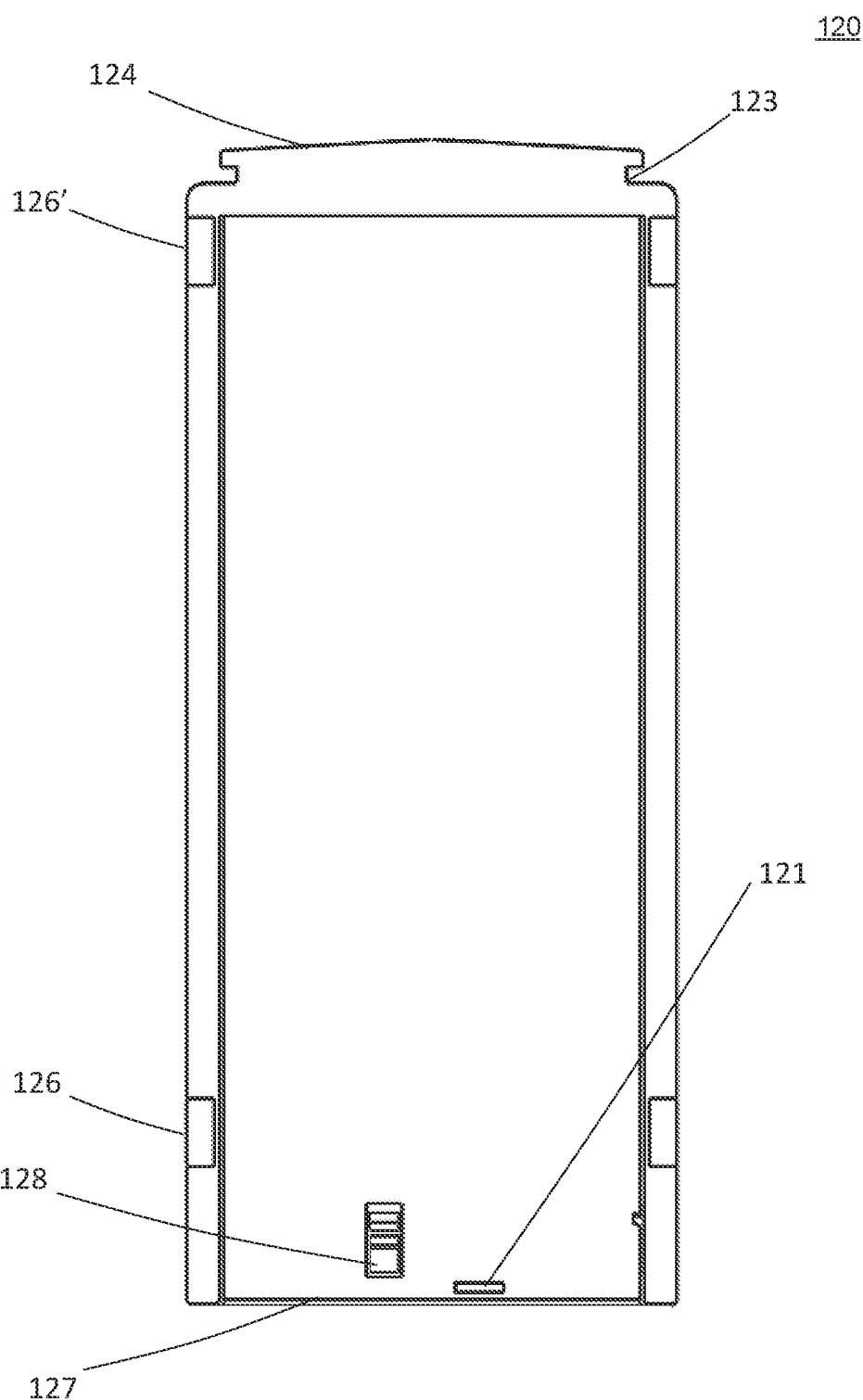
FIG. 5N is a cross sectional side view of the container of FIG. 5M.
Figures 5O, 5P, 5Q:
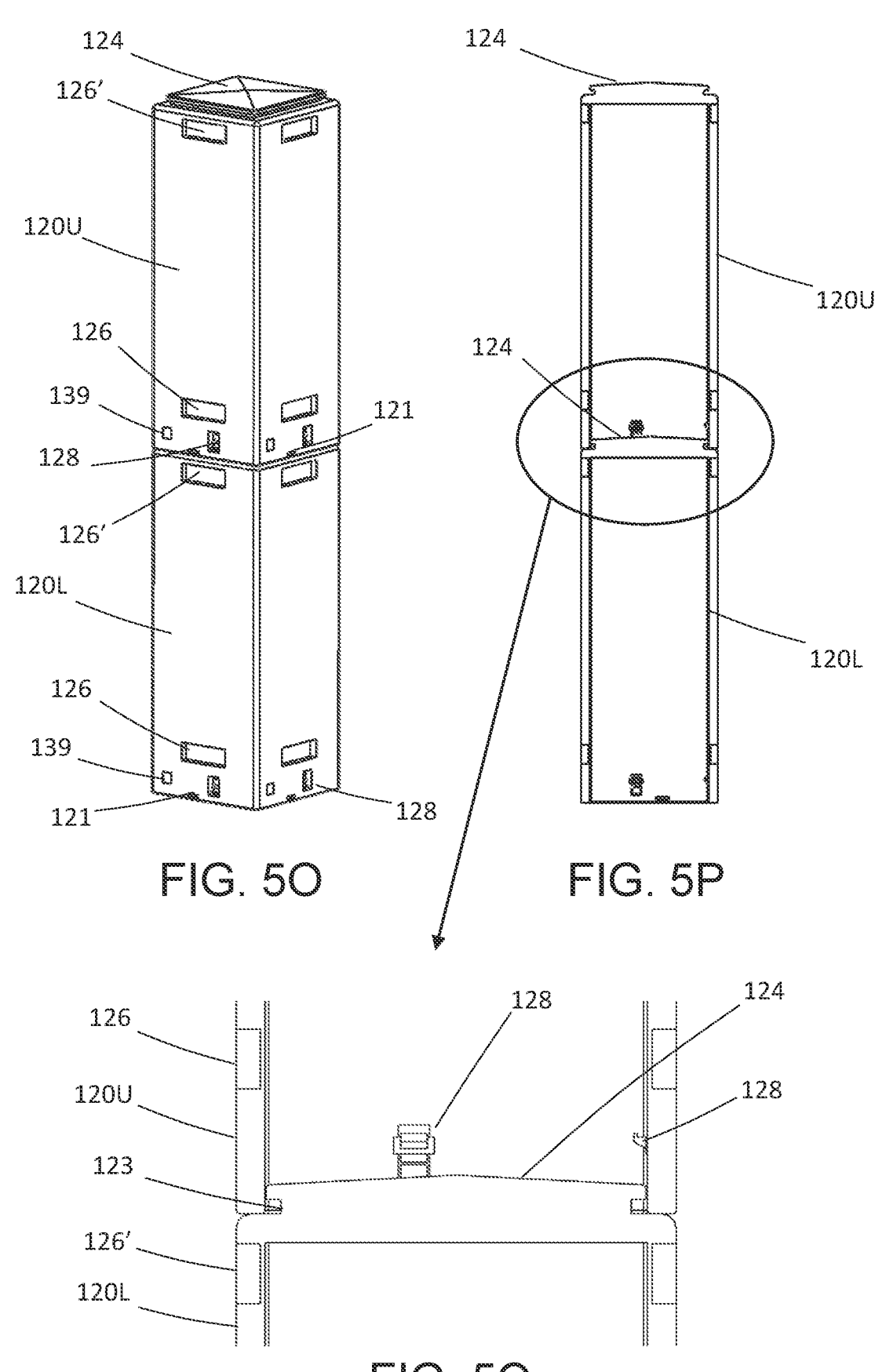
FIG. 5O illustrate a perspective view of the stacking of two containers.
FIG. 5P is a cross sectional view of FIG. 5O.
FIG. 5Q is a detailed close up view at the interface of the stacked containers of FIG. 5P.

FIG. 5N is a cross sectional side view of the container 120 of FIG. 5M to more clearly illustrate the recess 123 and open bottom 127 of the container 120. FIG. 5O illustrates a perspective view of the stacking of two containers 120. FIG. 5P is a cross sectional view of FIG. 5O that shows how the recess 123 of a lower container 120L fits into the open bottom 127 of the upper container 120U. FIG. 5Q is a detailed close-up view at the interface of the stacked containers shown in FIG. 5P.

Figure 6A:
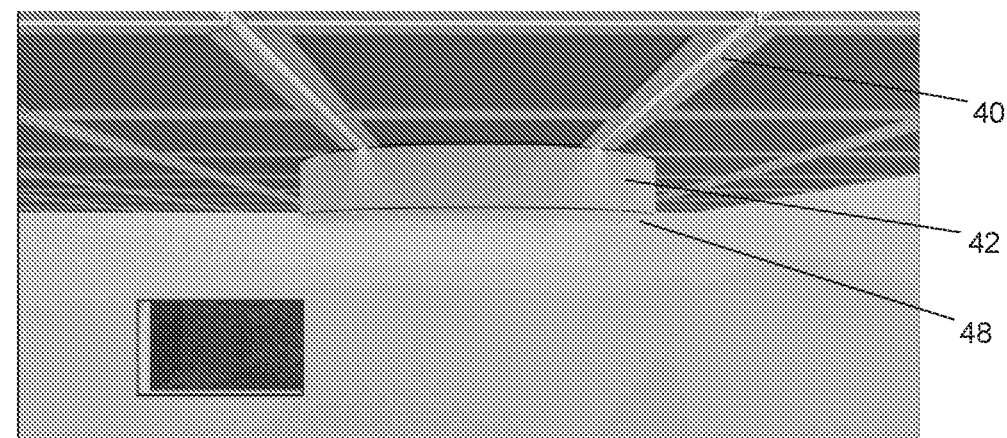
FIGS. 6A-6X are a series of views of the automated removal of item trays shown as containing recyclable materials from a residence or office in accordance with embodiments of the invention.
Figure 6B:
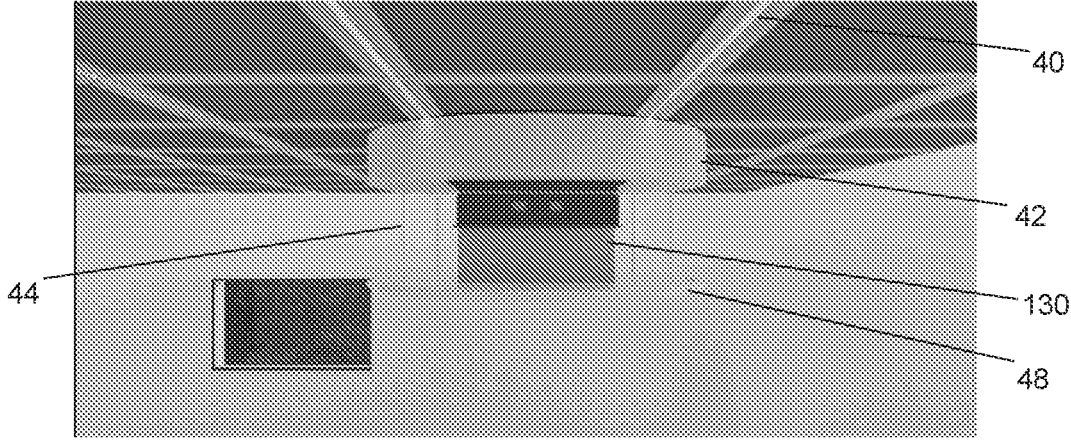
Figure 6C:
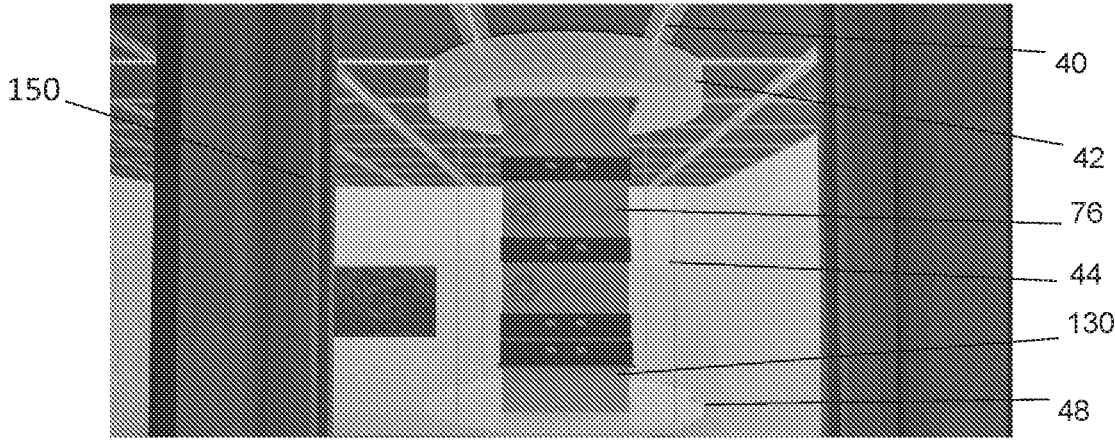
Figure 6D:
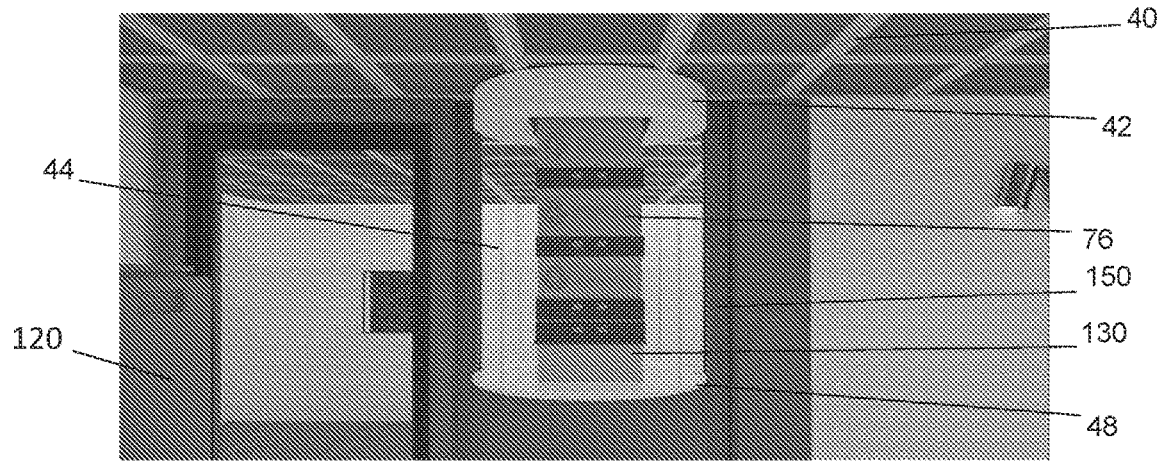
Figure 6E:
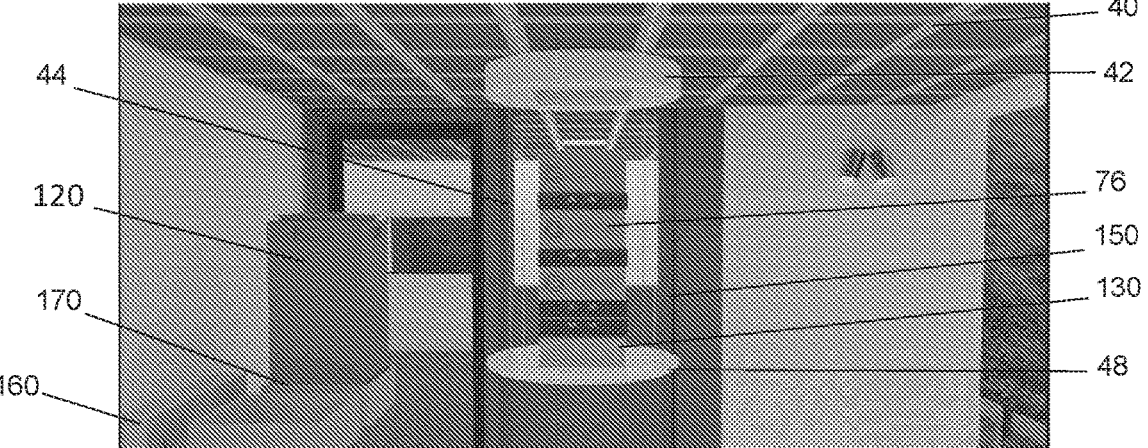
Figure 6F:
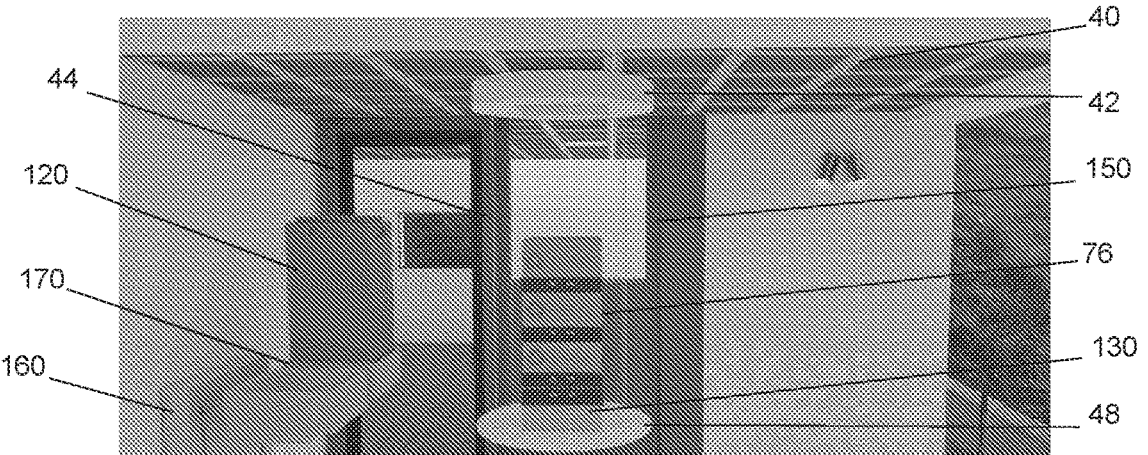
Figure 6G:
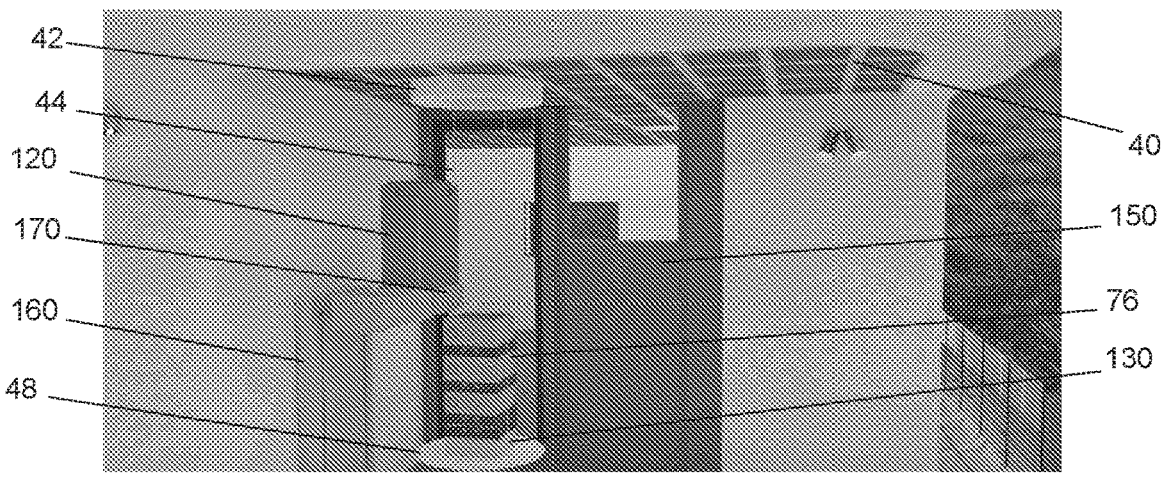
Figure 6H:
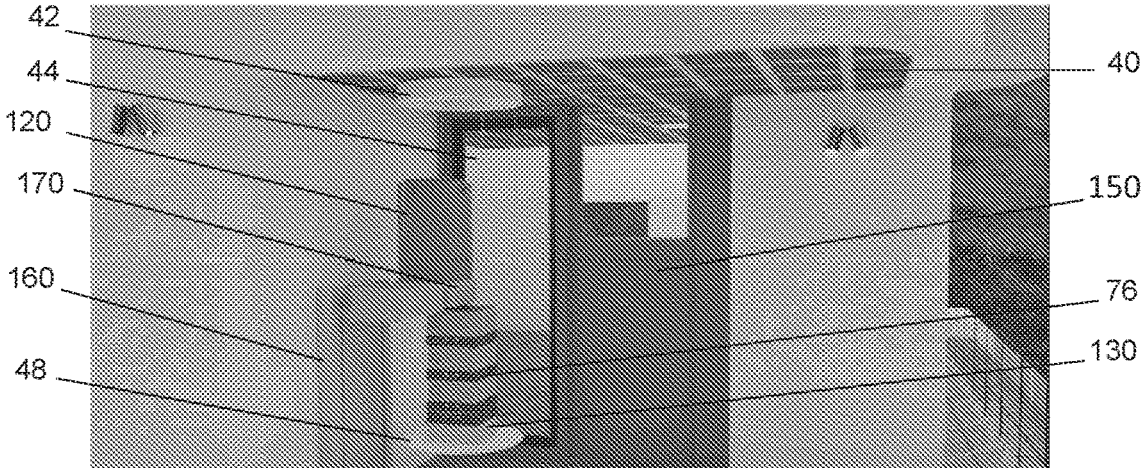
Figure 6I:
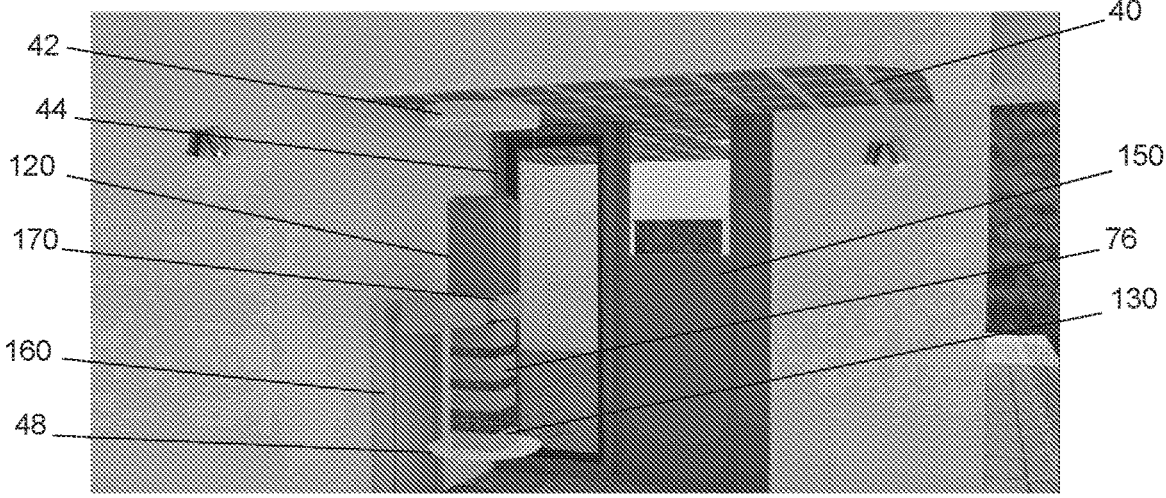
Figure 6J:
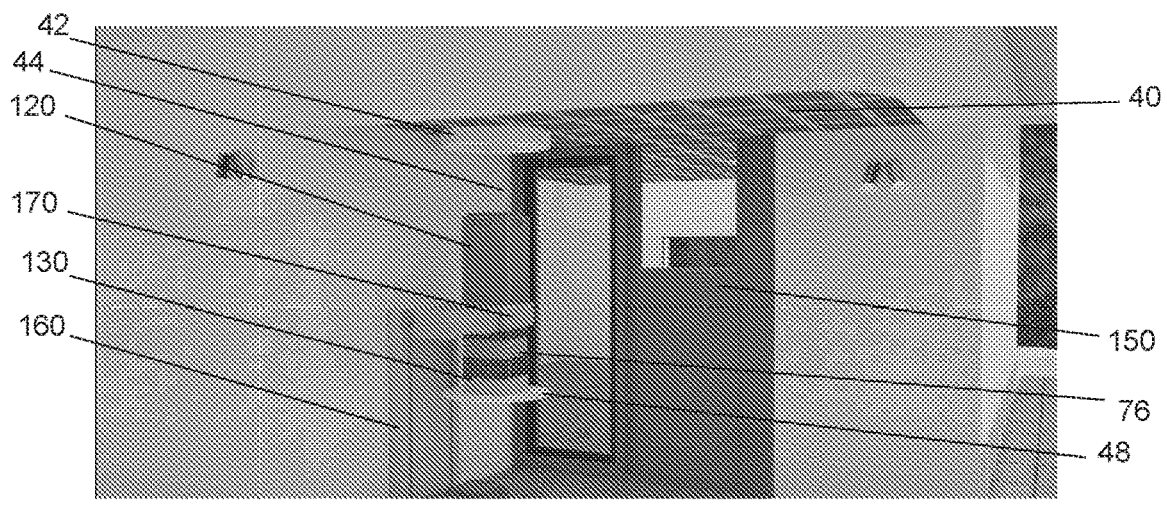
Figure 6K:
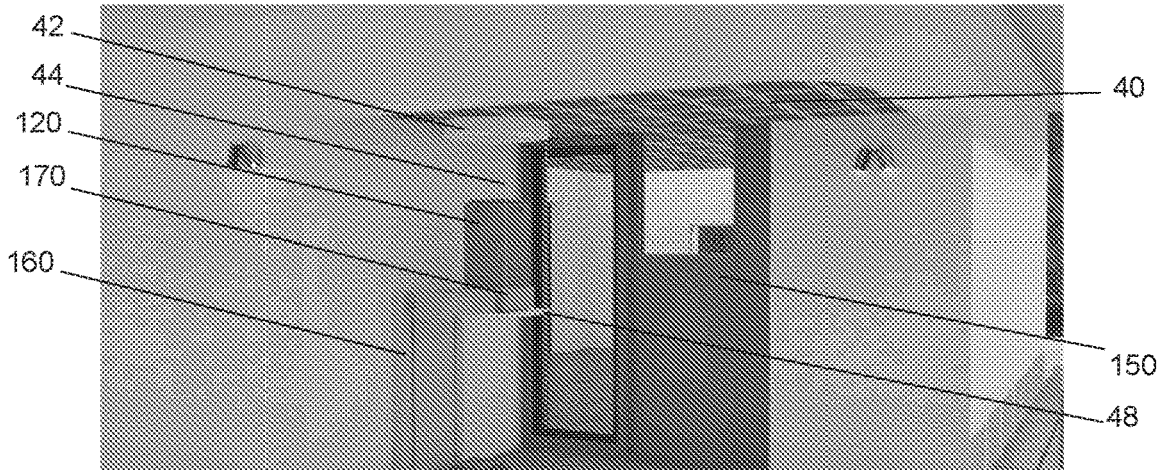
Figure 6L:
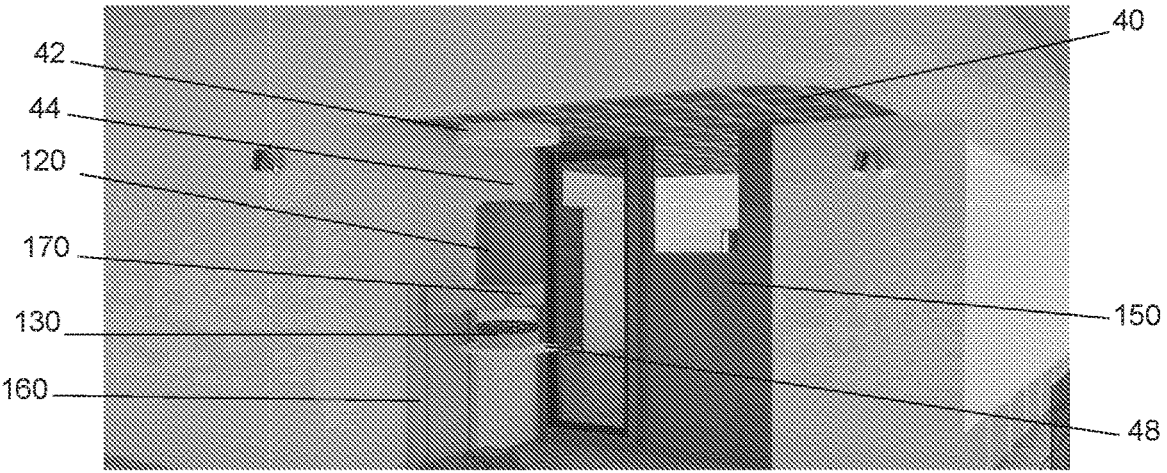
Figure 6M:
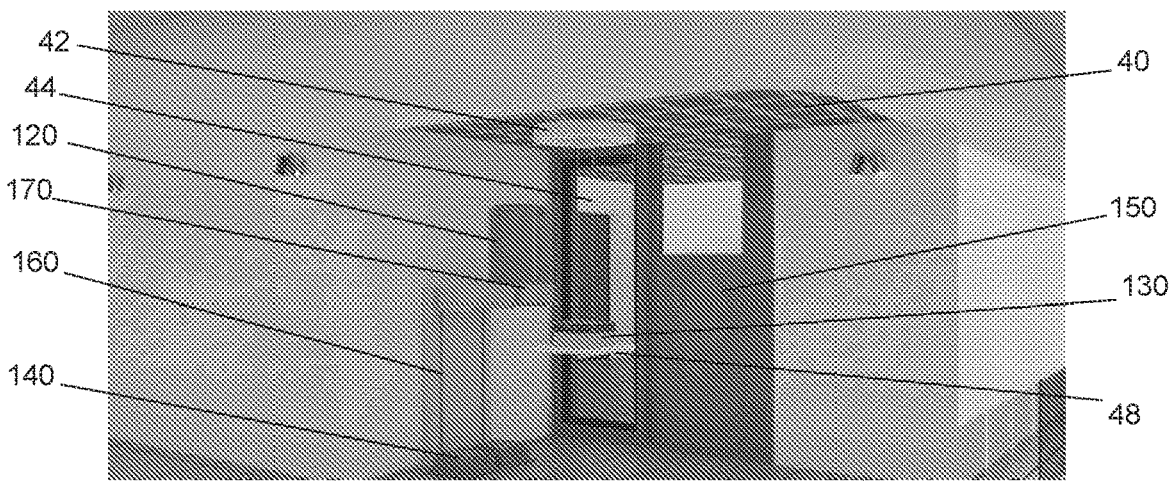
Figure 6N:
Figure 6O:
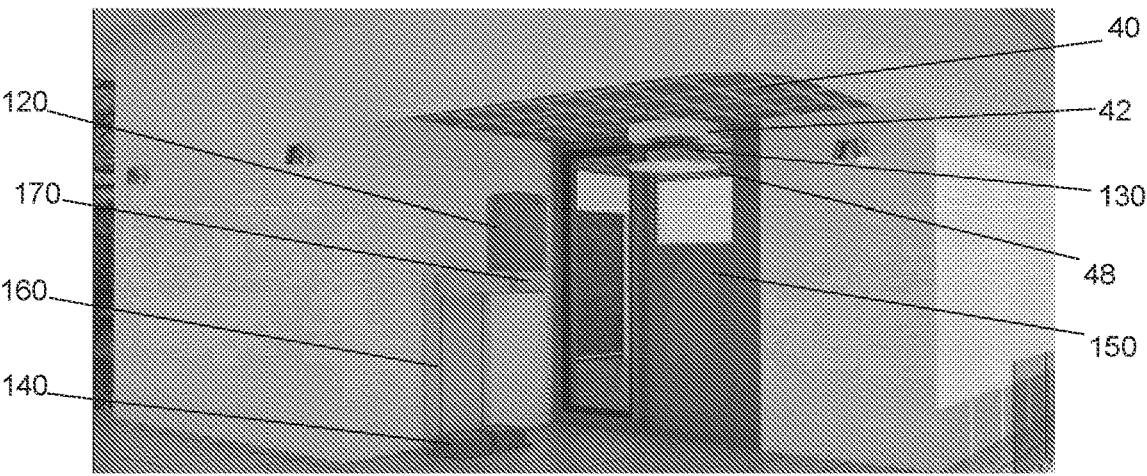
Figure 6P:
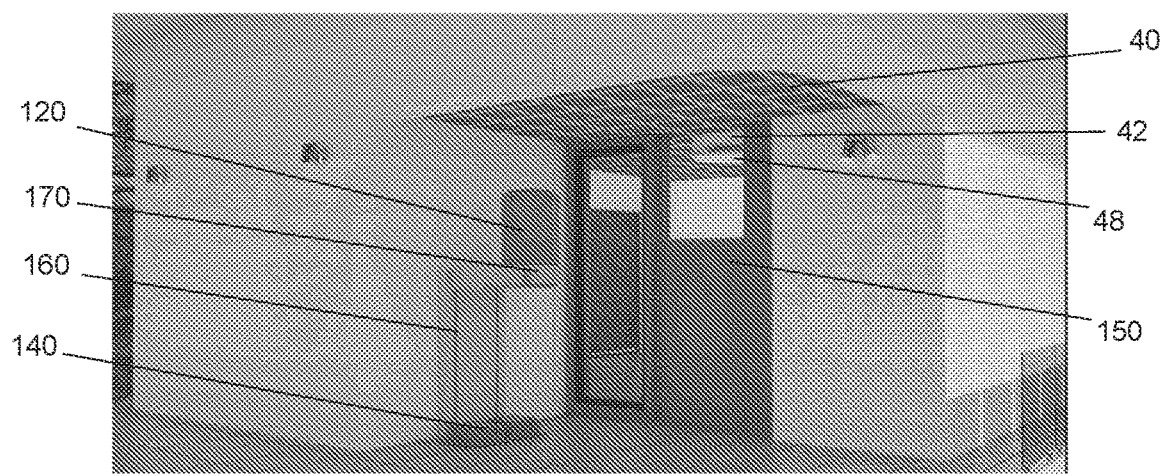
Figure 6Q:
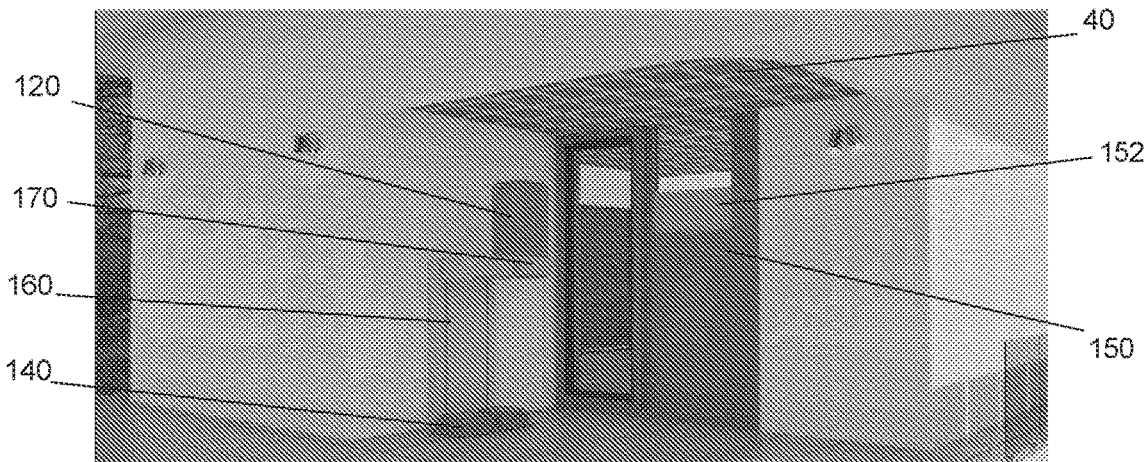
Figure 6R:
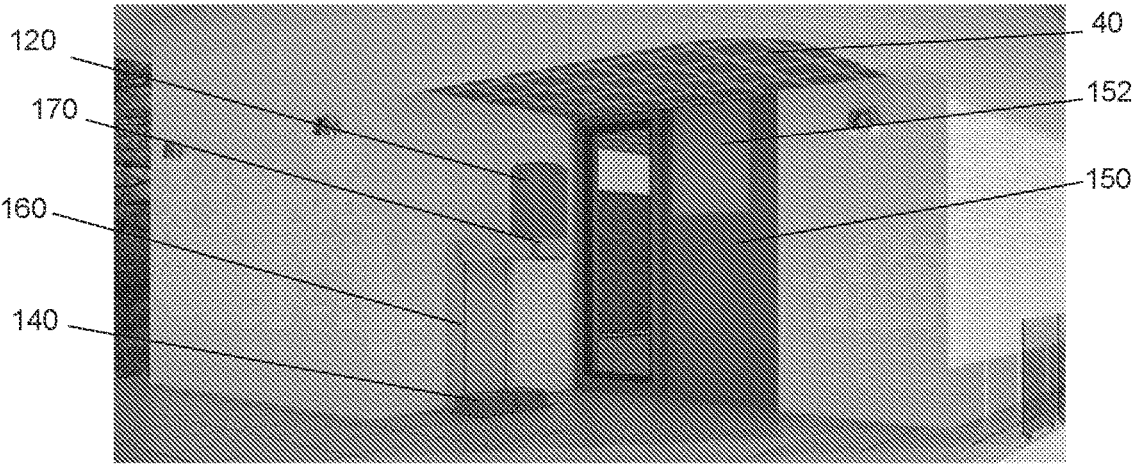
Figure 6S:
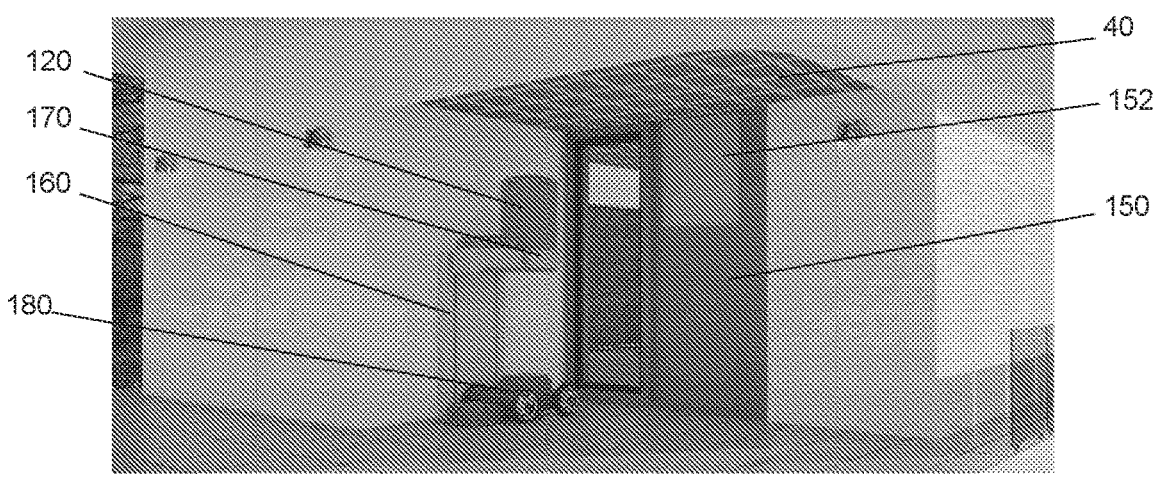
Figure 6T:
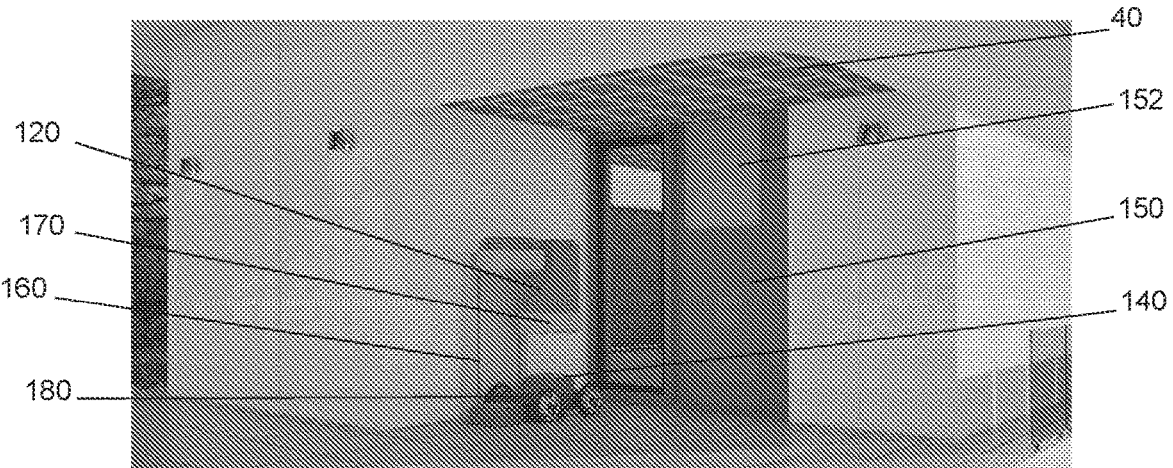
Figure 6U:
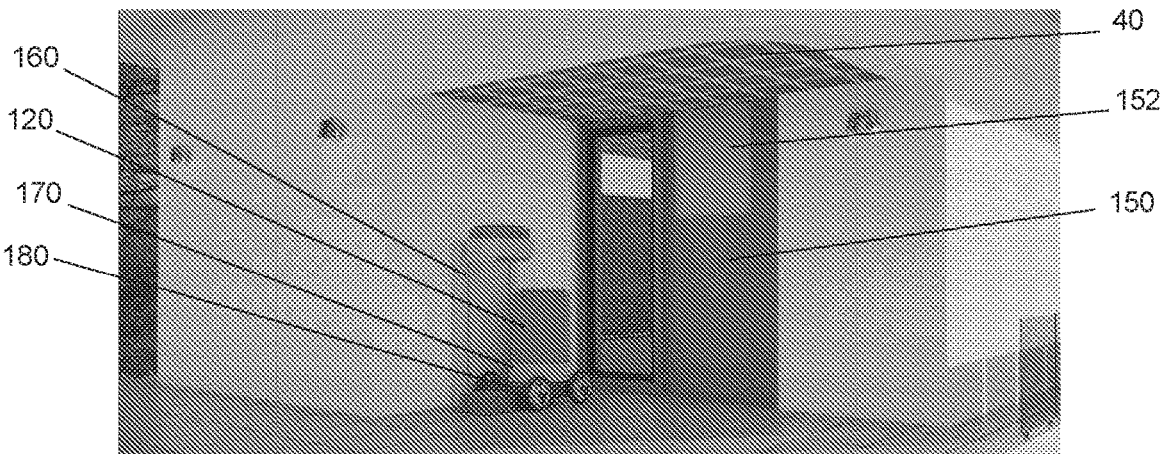
Figure 6V:
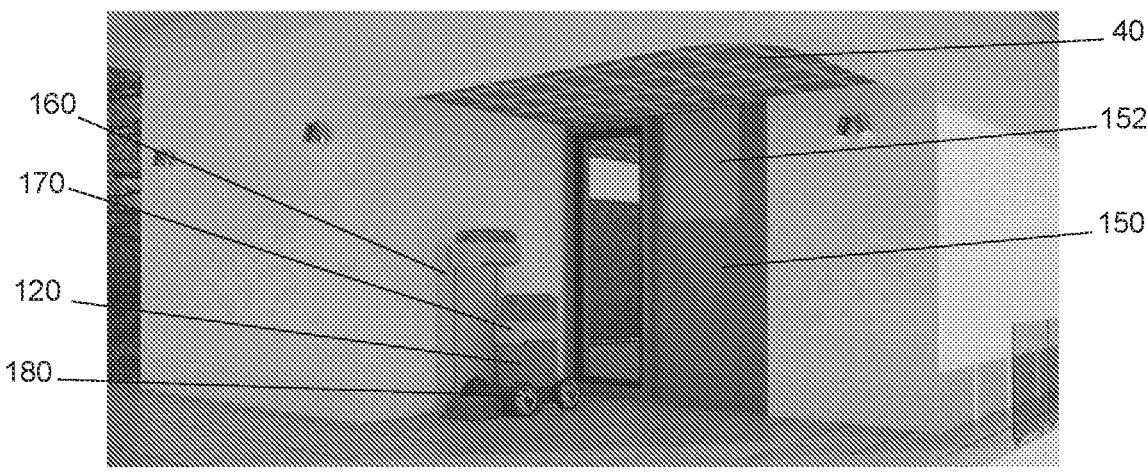
Figure 6W:
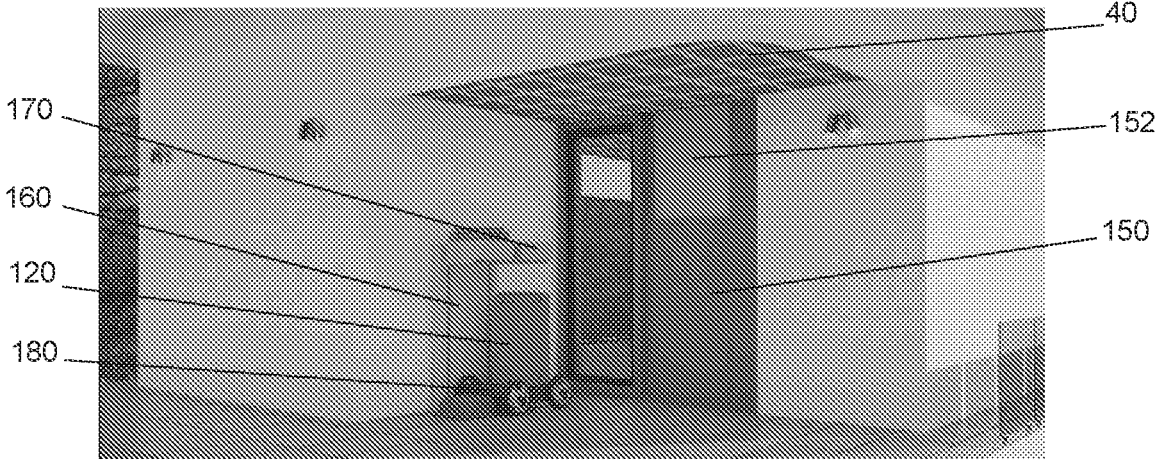
Figure 6X:
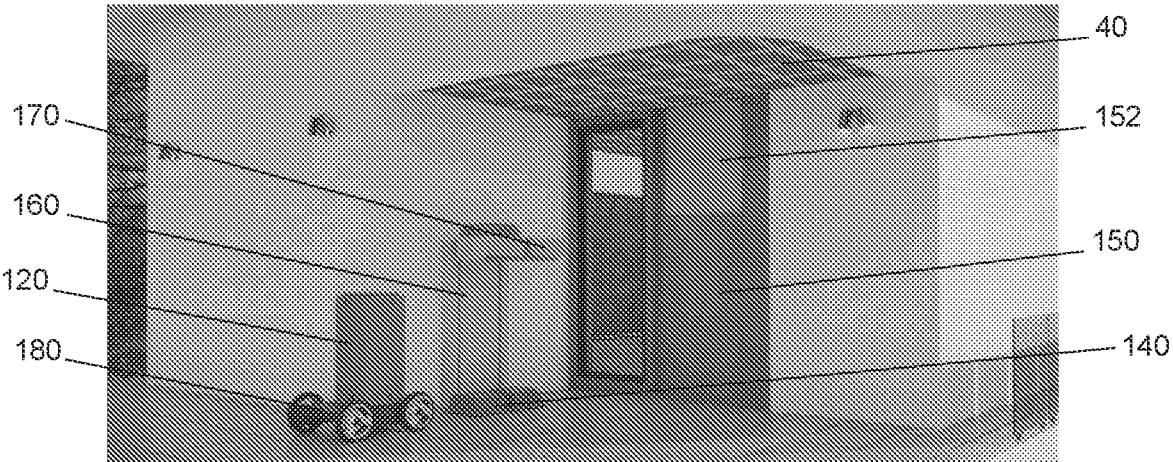

FIGS. 6A-6X are a series of views of the automated removal of recyclable materials from a residence, office or fulfillment center in accordance with embodiments of the invention. FIG. 6A shows a ceiling mounted X-Y rail system 40 with a gantry 42 positioned in a location prior to retrieval of a load of recyclable materials. FIG. 6B shows the initial descent of the platform 48 held to the gantry 42 by drive cables 44. The platform 48 is supporting item tray 130. FIG. 6C shows a further downward deployment of the platform 48 that reveals a stack 76 of pre-sorted recyclable materials sorted by glass, metal, and paper. It is appreciated that the stack 76 can be any sort of stored items depending on the application or retrieval required. FIGS. 6C and 6D illustrate the gantry 42 moving through an aperture in a wall or door 150. The aperture is opened and closed with retractable panel 152 as shown in FIGS. 6Q and 6R. As shown in FIGS. 6C and 6D the stack 76 of recyclables is moved to an outdoor area. It is appreciated that in those inventive embodiments in which storage modules are leased to serve as a localized warehouse for subsequent deliveries, that the steps detailed in FIGS. 6A-6X are also operative to convey such goods as a variant of the stack 76. It is further appreciated that a warehousing fee is readily paid for such warehousing storage.

In FIGS. 6E-6I the platform 48 is further lowered and is moved toward a holding receptacle into a position under a container 120 held on a transfer station 160 by lift arm 170. The transfer station 160 may be located as a stand-alone unit positioned against a wall of a building or home, in a parking lot or driveway, in a car garage, in a business, or in a special robot garage such as for a fulfillment center, home, or a retailor. In FIGS. 6J and 6K the platform 48 is lifted upwards toward the gantry 42 until the top of the platform 48 reaches the bottom of the lift arm 170 and the item tray 130 engages with container 120 to pass and secure the stack of trays 76 with recyclables to the container 120. In FIG. 6L the platform 48 lowers from the gantry 42 and disengages from the container 120 with the load of recyclables remaining in the container 120. In FIG. 6M the gantry 42 moves away from the holding receptacle, and in FIGS. 6N and 6O the platform 48 is raised in preparation for moving the gantry 42 back indoors. FIG. 6P illustrates the movement of the gantry 42 through the aperture or opening in the wall or door 150, followed by the closing of the retractable panel 152 as shown in FIGS. 6Q and 6R. Robotic shuttle vehicle 180 moves into position over docking station 140 in FIG. 6S. In FIGS. 6T and 6U the container 120 housing the stack of trays 76 with recyclables is lowered down by the transfer station 160 with lift arm 170 onto the position of the docking station 140 that is occupied by the robotic shuttle vehicle 180. The lift arm 170 disengages from the container 120, and the container 120 is engaged with the robotic shuttle vehicle 180. In FIGS. 6V and 6W the lift arm 170 is raised upward and away from the container 120. The robotic shuttle vehicle 180 drives away from the docking station 140 in FIG. 6X to the curb, to a communal collection point for an apartment or office complex, a fulfillment center, a recycling center, to meet a recycling truck for recycling pick up, or an autonomous vehicle 190.

Figure 7A:
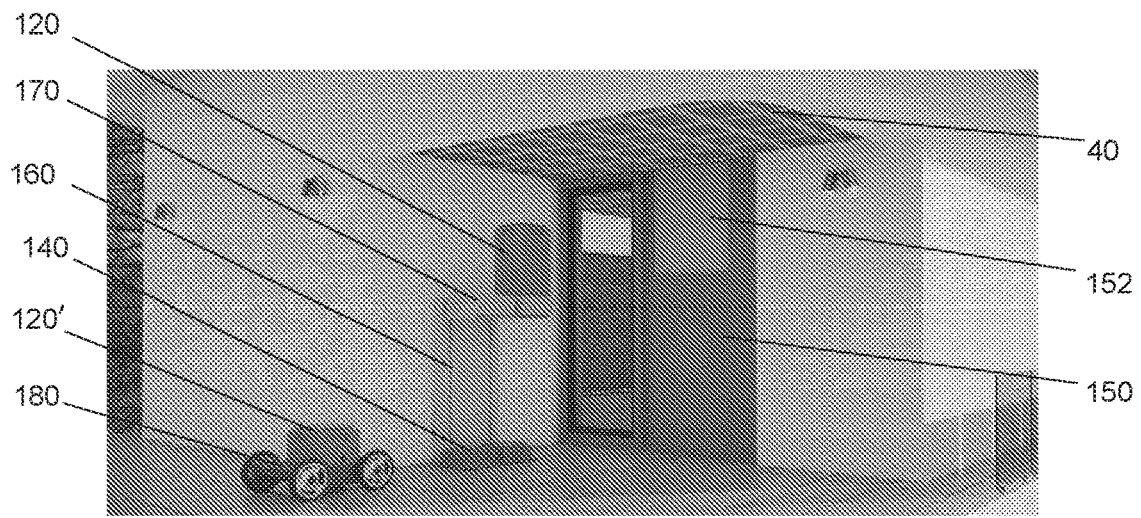
FIGS. 7A-7R are a series of views of the automated reception and secure retrieval of a delivered item tray for a residence or office in accordance with embodiments of the invention.
Figure 7B:
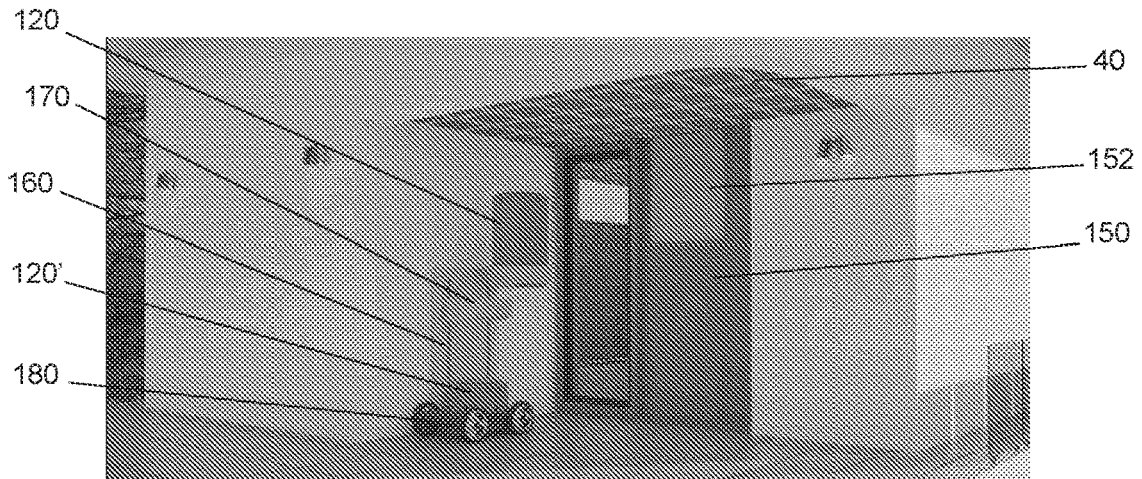
Figure 7C:
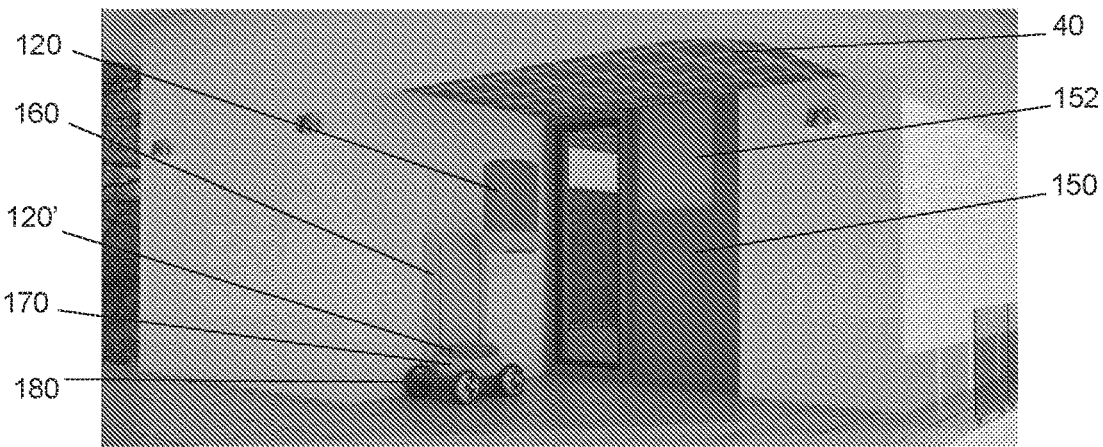
Figure 7D:
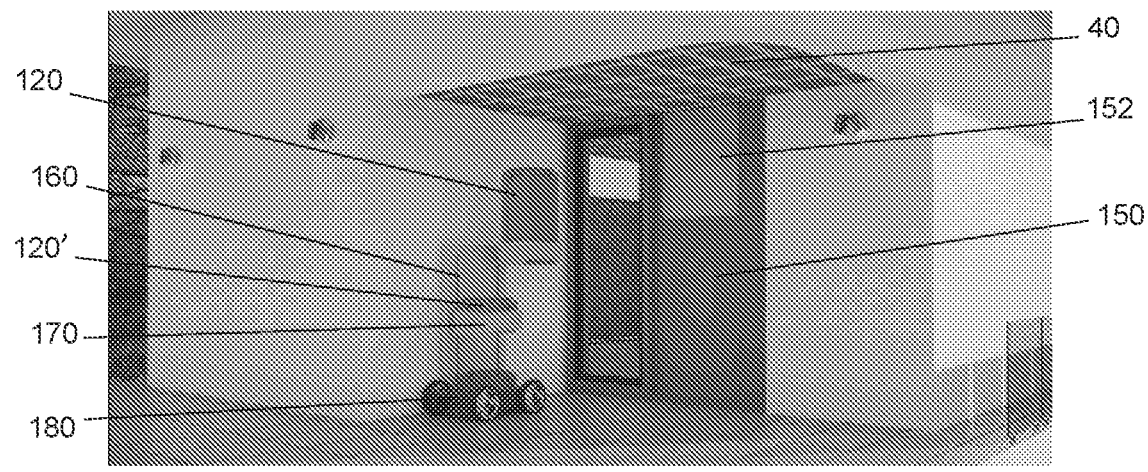
Figure 7E:
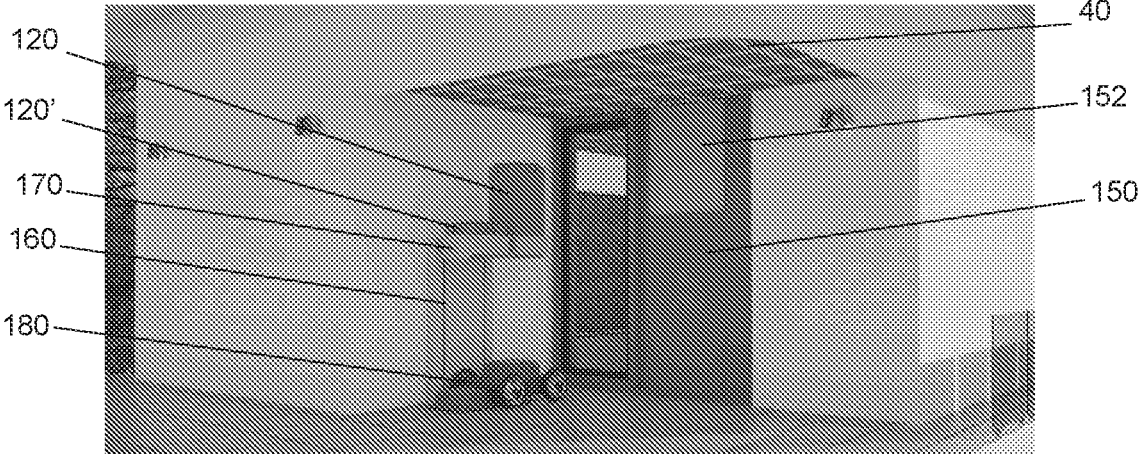
Figure 7F:
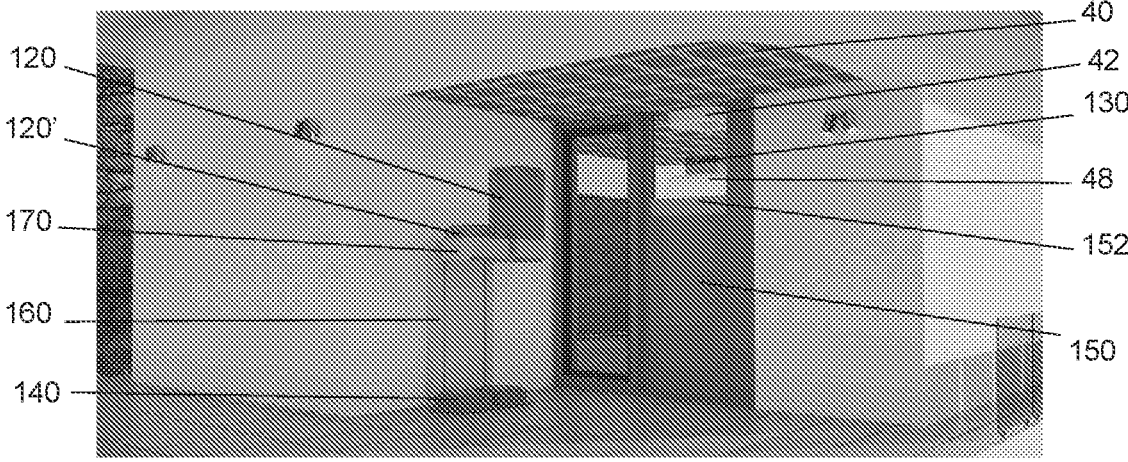
Figure 7G:
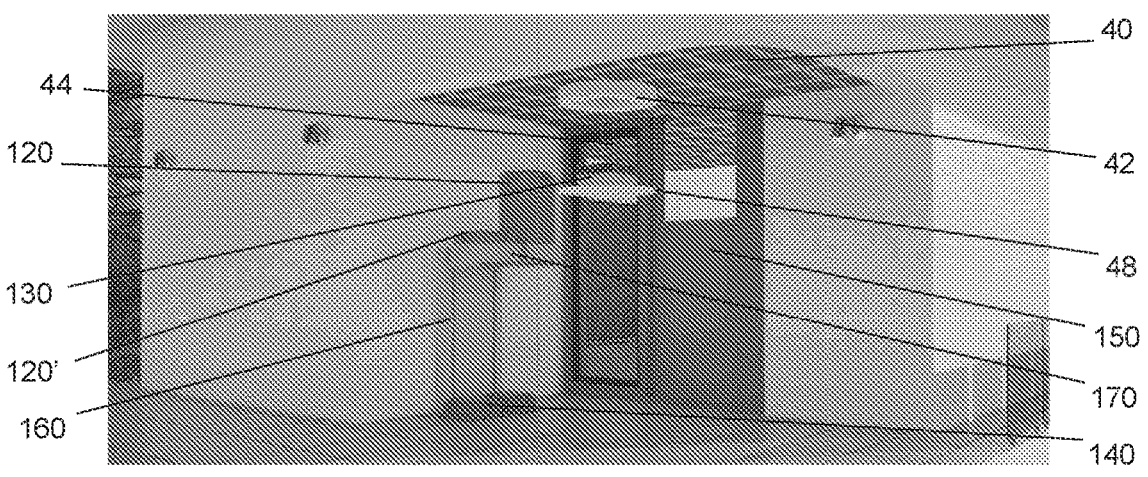
Figure 7H:
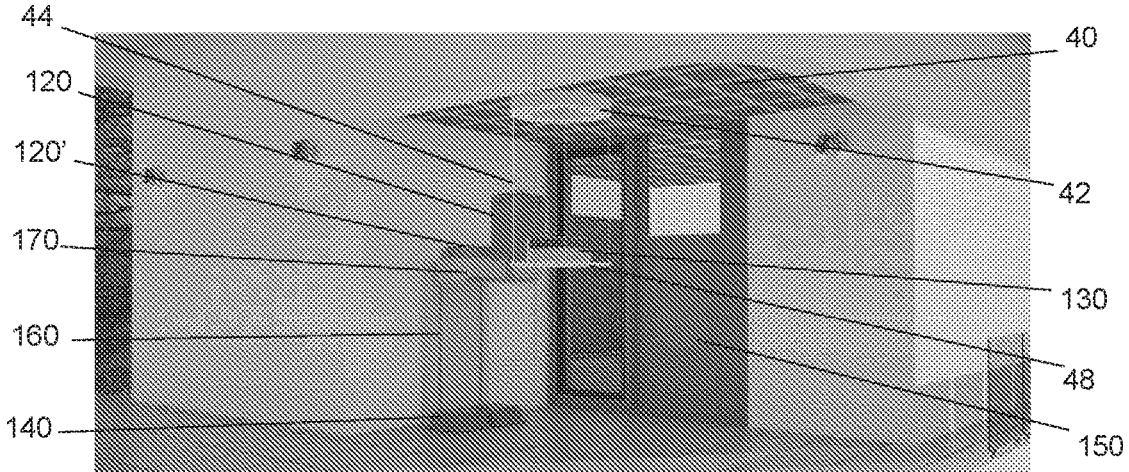
Figure 7I:
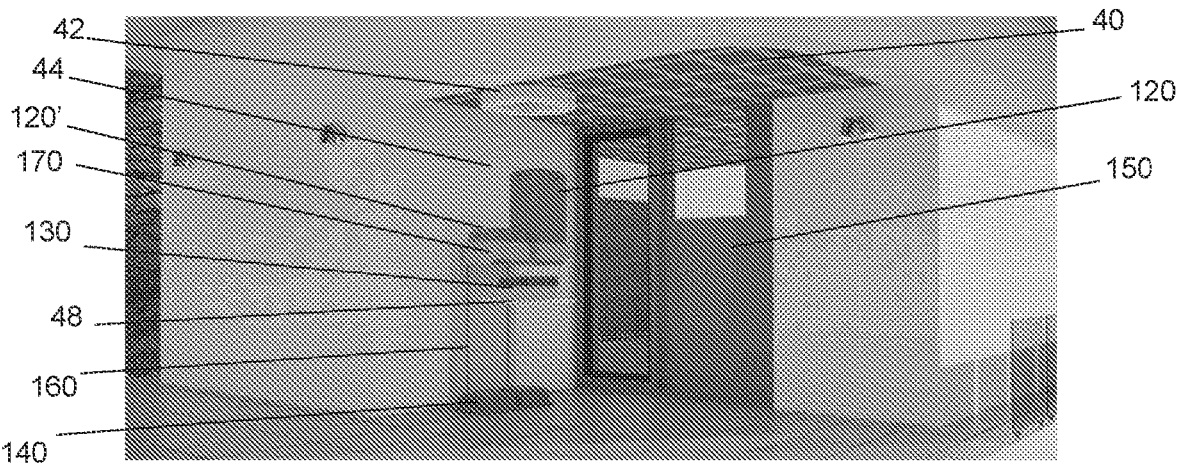
Figure 7J:
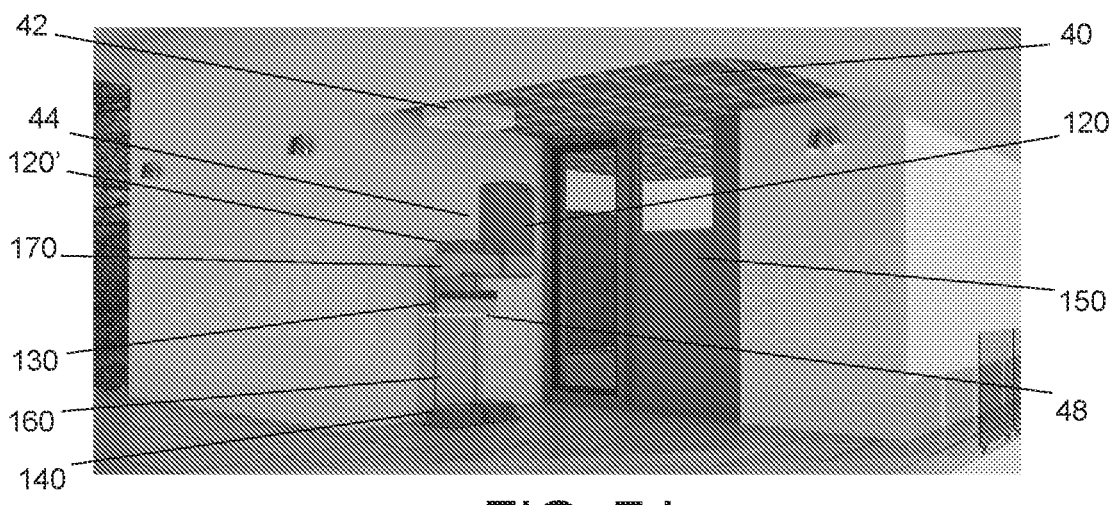
Figure 7K:
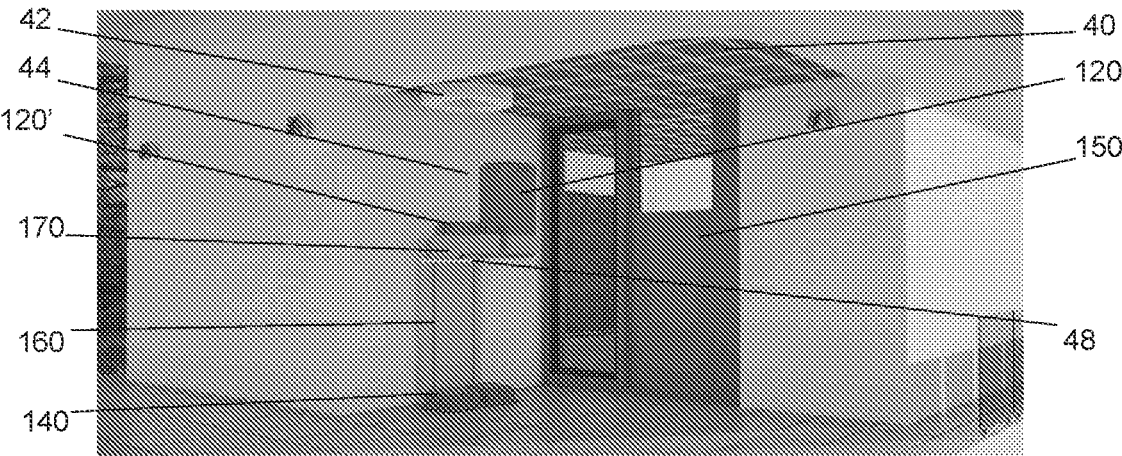
Figure 7L:
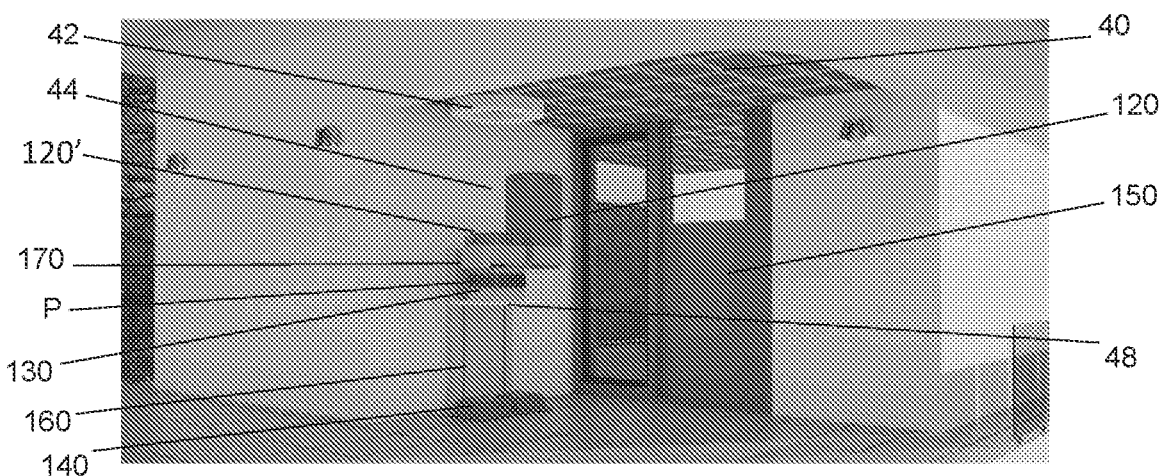
Figure 7M:
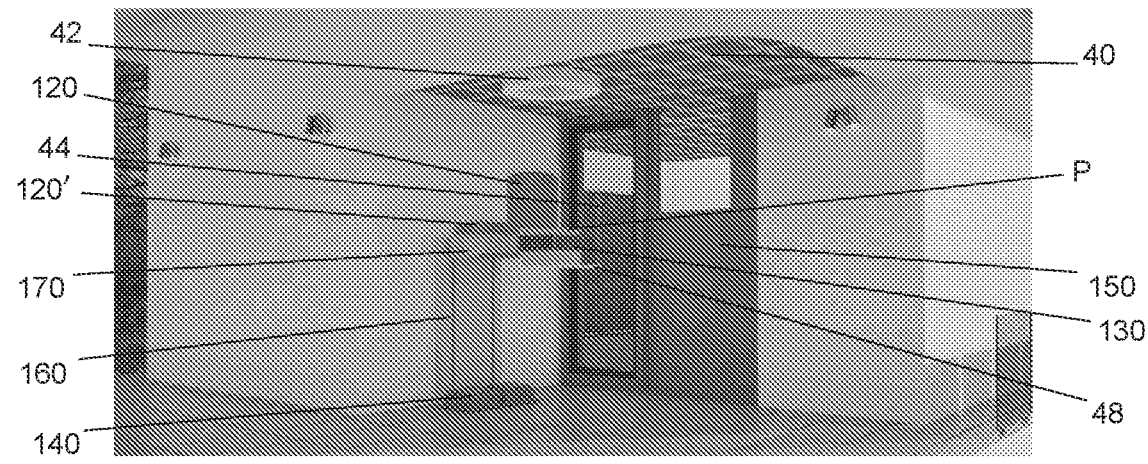
Figure 7N:
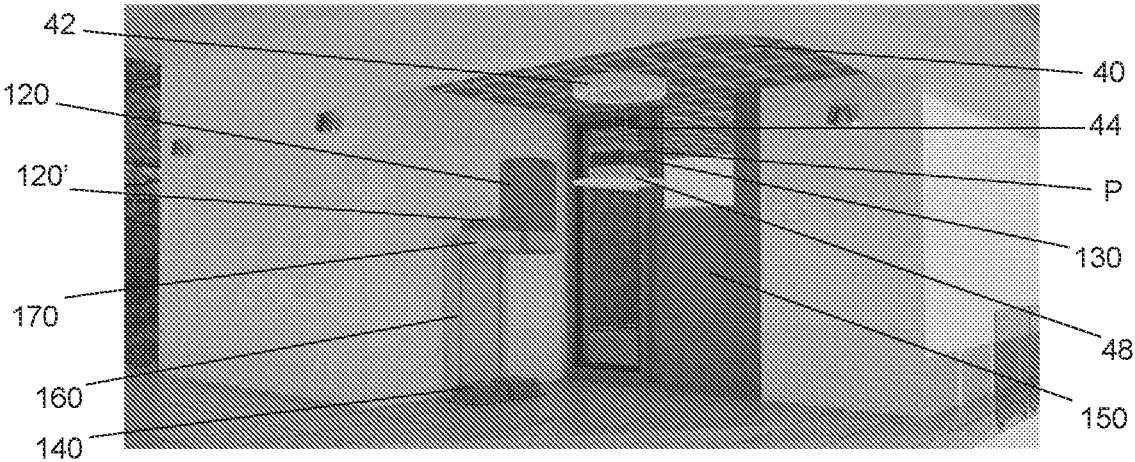
Figure 7O:
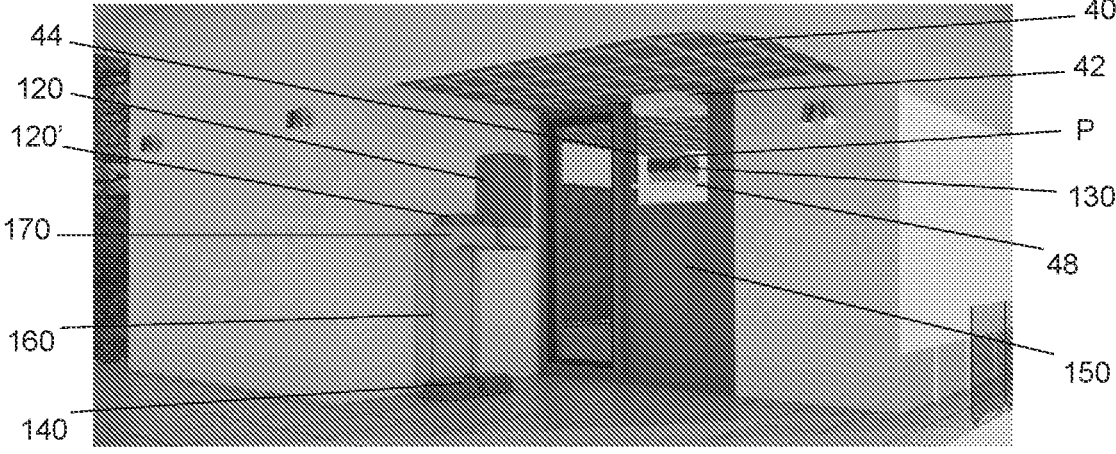
Figure 7P:
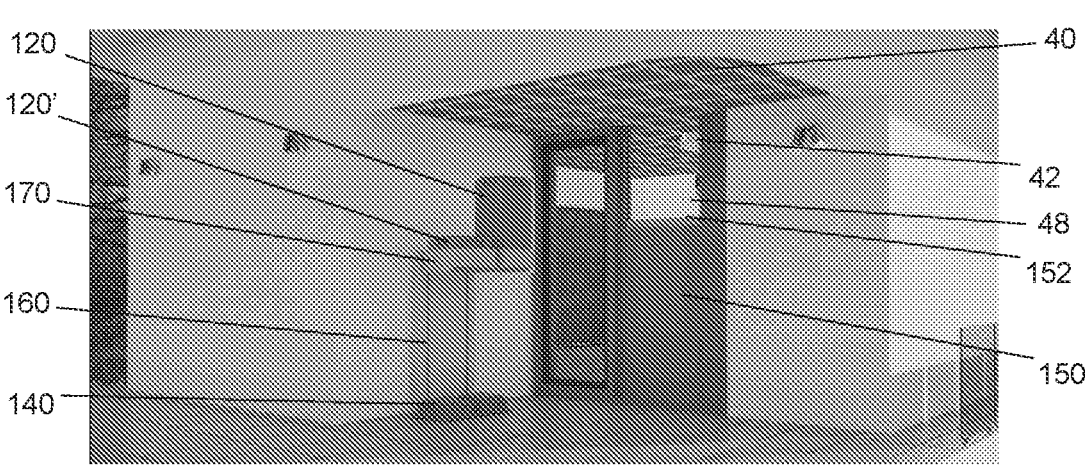
Figure 7Q:
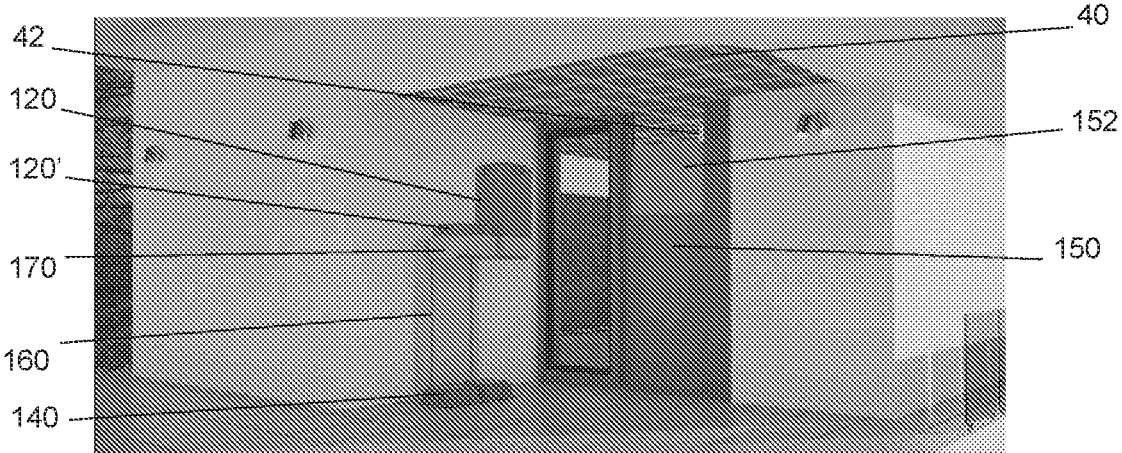
Figure 7R:
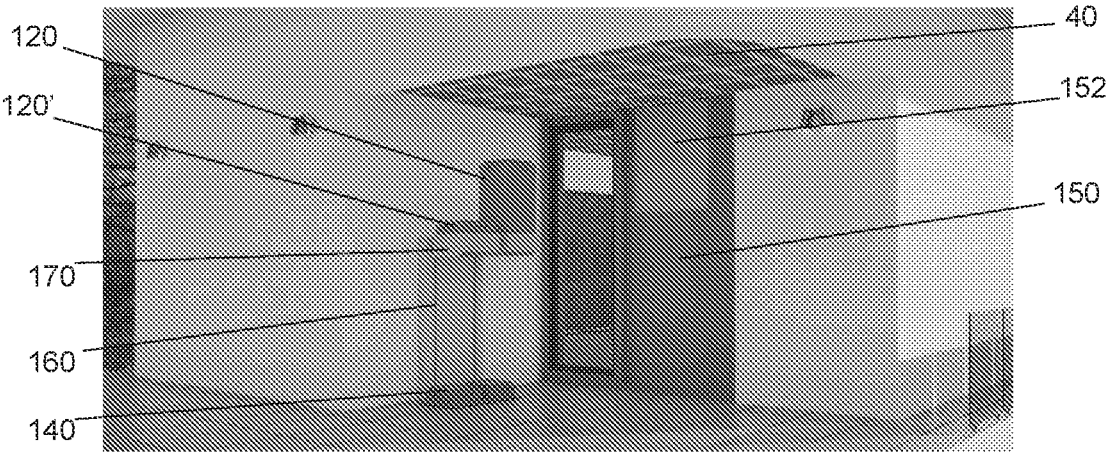

FIGS. 7A-7R are a series of views of the automated reception and secure retrieval of a delivered package for a residence, office, or fulfillment center. In FIG. 7A the robotic shuttle vehicle 180 brings a package P on item tray 130 held in container 120', which may have been just delivered, to the docking station 140. It is noted that in all the FIGS. 7A-7R the second position on the transfer station 160 is occupied by a container 120, which is not involved in the package delivery process being illustrated. In FIGS. 7B and 7C the lift arm 170 is lowered to engage the container 120' holding the package P on item tray 130. In FIGS. 7D and 7E the lift arm 170 is raised with the container 120'. In FIG. 7F the robotic delivery vehicle drives off. Also shown in FIG. 7F retractable panel 152 is lowered in the wall or door 150 to allow the gantry 42 to proceed outdoors to retrieve and secure the package P on item tray 130. In FIGS. 7G-7J the platform 48 is further lowered and is moved toward the holding receptacle into a position under the container 120' held on the transfer station 160 by lift arm 170. In FIG. 7K the platform 48 is lifted upwards toward the gantry 42 until the top of the platform 48 reaches the bottom of the lift arm 170 and the item tray 130 disengages with container 120', and the item tray 130 and package P is released to the platform 48. In FIG. 7L the platform 48 lowers from the gantry 42 and disengages from the container 120 with the package P resting in the item tray 130. In FIG. 7M the gantry 42 moves away from the holding receptacle, and in FIG. 7N the platform 48 is raised in preparation for moving the gantry 42 back indoors. FIG. 7O illustrates the movement of the gantry 42 through the aperture or opening in the wall or door 150, followed by the closing of the retractable panel 152 as shown in FIGS. 7P-7R. The system and method shown in FIGS. 7A-7R allow for contactless delivery of a package that also provides for the secure retrieval and storage of a delivered package indoors away from the chance of theft and exposure to the existing weather. It is appreciated that in those inventive embodiments in which storage modules are leased to serve as a localized warehouse for subsequent deliveries, that the steps detailed in FIGS. 7A-7R are also operative to convey such goods to load, unload, or both. It is further appreciated that a warehousing fee is readily paid for such warehousing storage.

Figures 8E, 8F:
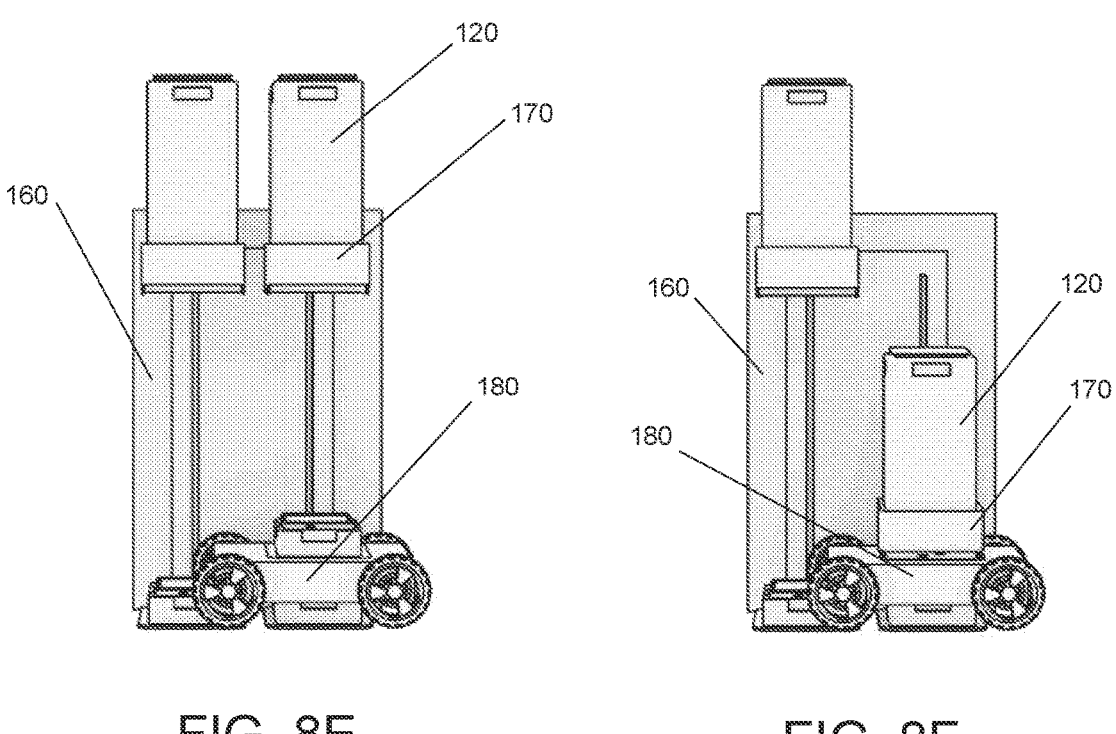
Figures 8G, 8H:
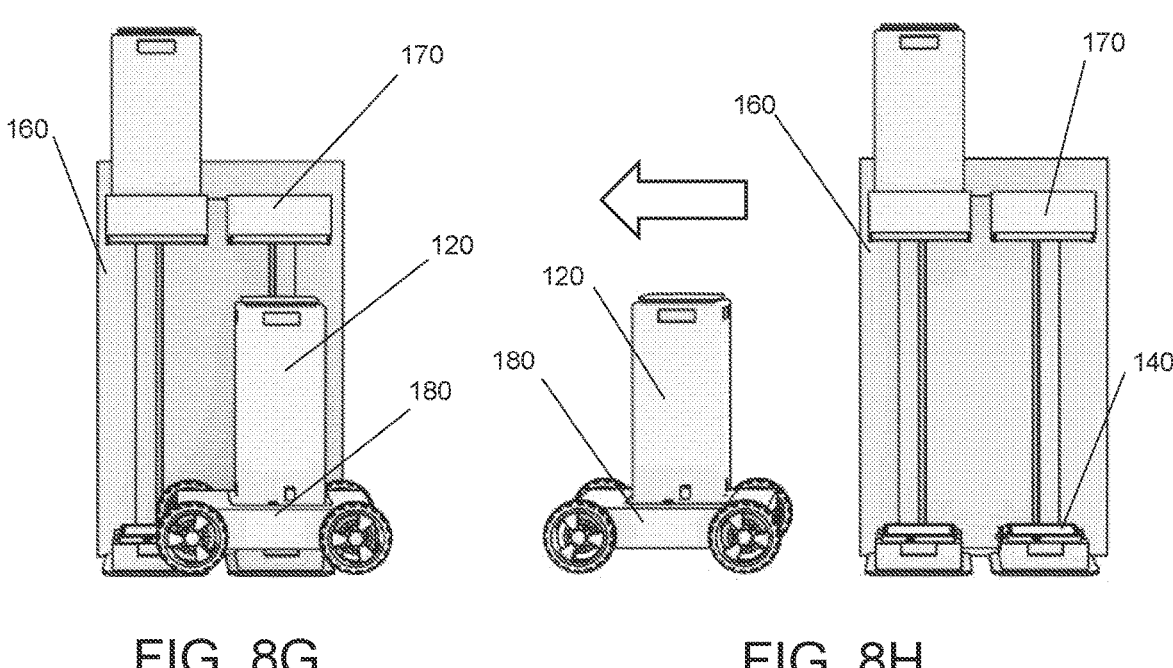

FIGS. 8A-8H are a series of sequential close-up views of the operation of the automated transfer station 160 as previously shown in FIGS. 6A-6X and 7A-7R. In FIG. 8A the robotic shuttle vehicle 180 loaded with a container 120 approaches the transfer station 160 with the docking stations 140. The fixed docking stations 140 on transfer station 160 are not used in this scenario. In FIG. 8B the robotic shuttle vehicle 180 positions itself over the first position docking station 140 of the automated transfer station 160. In FIG. 8C the lift arm 170 is lowered down and engages the container 120 the docking station 140 of the robotic shuttle vehicle 180 releases the container from the robotic shuttle vehicle 180. In FIG. 8D the lift arm 170 holding the container 120 is raised, and in FIG. 8E the robotic shuttle vehicle 180 moves into the second position of the automated transfer station 160. In FIG. 8F the second position lift arm 170 holding a second container 120 is lowered so as to position the container 120 on the docking station 140 of the robotic shuttle vehicle 180. The docking station 140 locks the container 120 onto the robotic shuttle vehicle 180. In FIG. 8G the lift arm 170 disengages from the container 120 and the lift arm 170 is raised. In FIG. 8H the robotic shuttle vehicle 180 with the second container drives off the automated transfer station 160. It is appreciated that in those inventive embodiments in which storage modules are leased to serve as a localized warehouse for subsequent deliveries, that the steps detailed in FIGS. 8A-8H are also operative to convey such goods to load, or unload, or both. It is further appreciated that a warehousing fee is readily paid for such warehousing storage.

Figure 9:
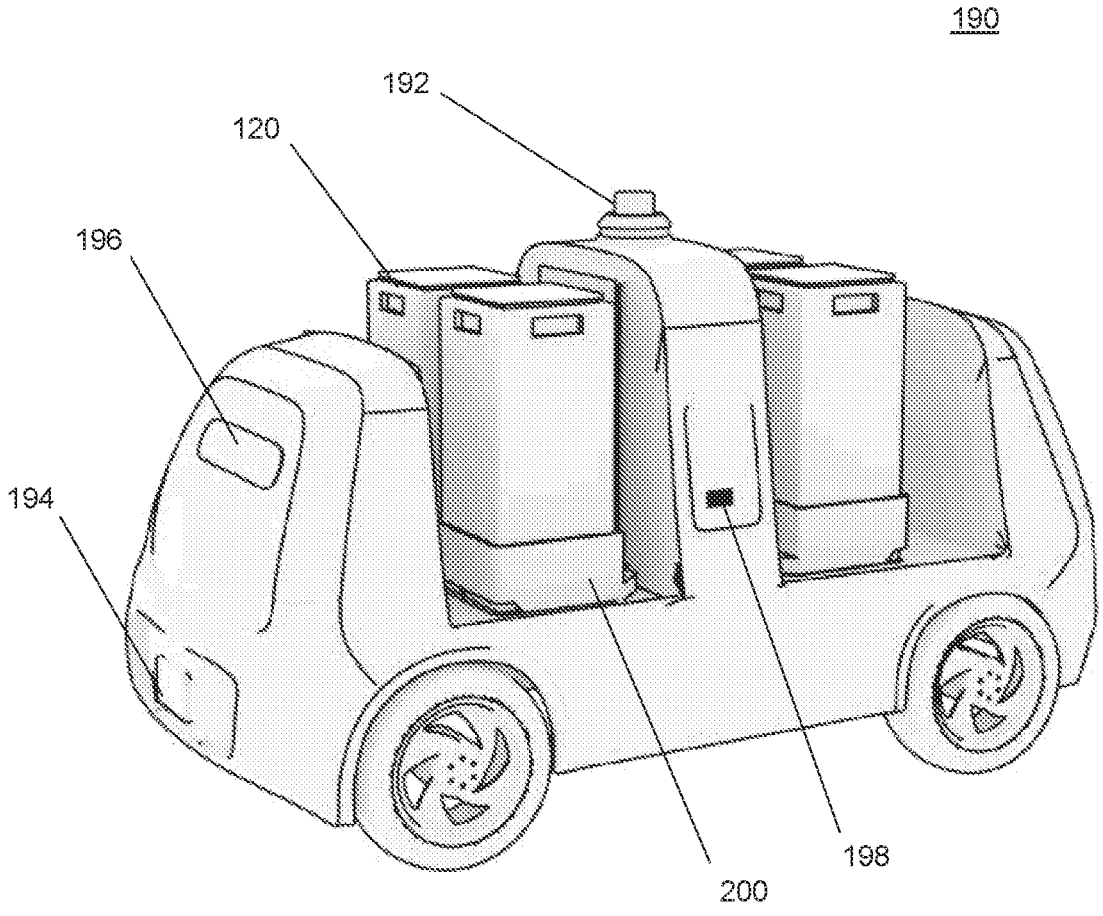
FIG. 9 illustrates an autonomous vehicle in accordance with embodiments of the invention.

FIG. 9 illustrates an autonomous self-driving vehicle 190 that is intended to drive on roads and highways for delivering and retrieving containers 120. The autonomous self-driving vehicle 190 may be gas powered or electric, or a hybrid. The autonomous self-driving vehicle 190 is equipped with a 360-degree camera 192 and sensors 194 to control movement, and a headlight/turn signal 196. As the autonomous self-driving vehicle 190 is bi-directional, the sensors 194 and headlight/turn signal 196 are positioned on both front and rear (not visible in the figures). Charge port 198 provides a connection point for an electrical charging station (not shown).

Figures 10A, 10B, 10C, 10D, 10E, 10F:
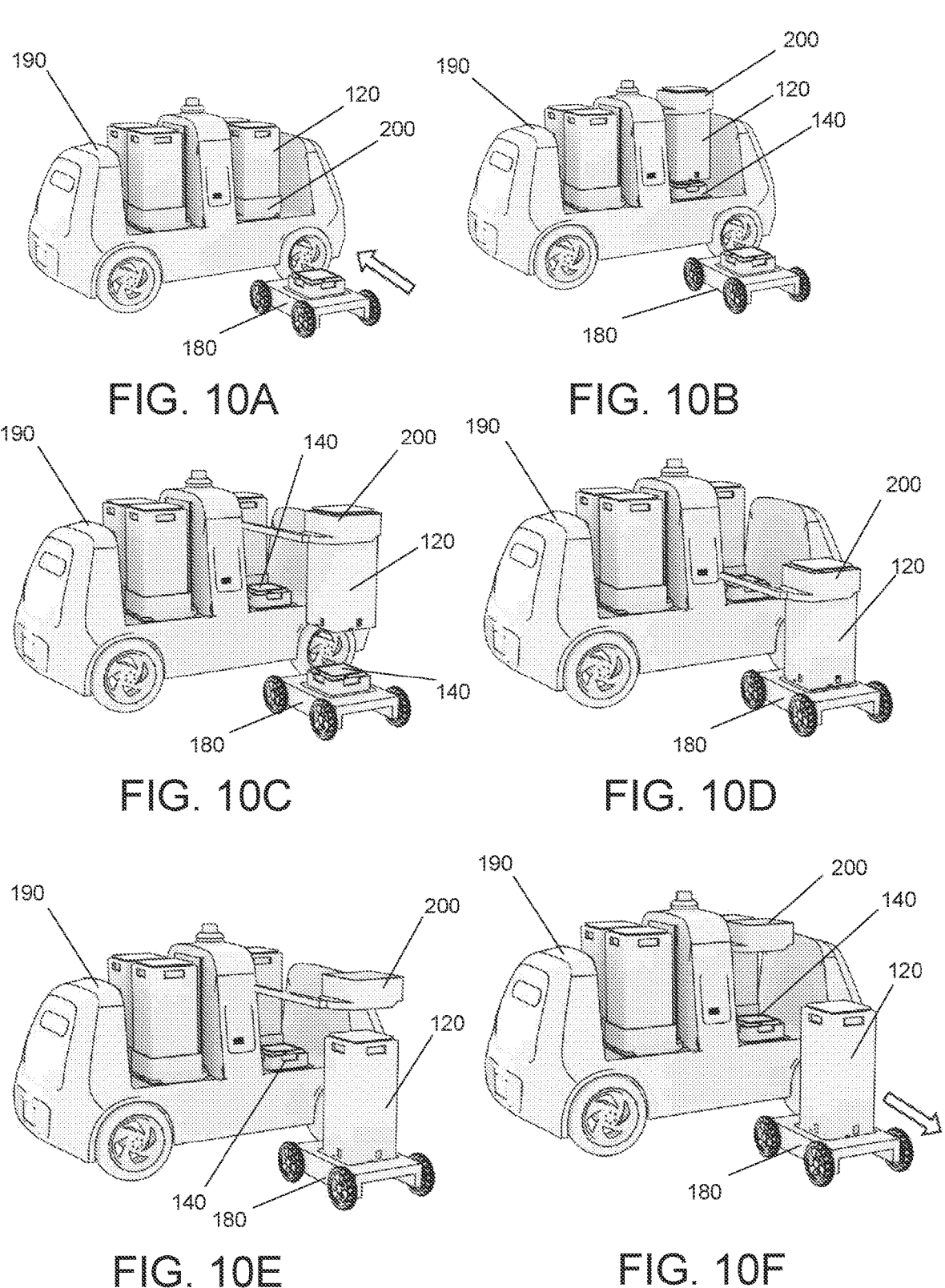
FIGS. 10A-10F are a series of views of the unloading of containers from the autonomous vehicle of FIG. 9.

FIGS. 10A-10F are a series of views of the unloading of containers from the autonomous vehicle of FIG. 9. In FIG. 10A the robotic shuttle vehicle 180 is shown approaching the autonomous self-driving vehicle 190 and positioning itself to receive a container 120. In FIG. 10B an extendable lift arm 200 begins to lift the container 200 from the autonomous self-driving vehicle 190 and the docking station 140. In FIG. 10C the extendable lift arm 200 projects outward from the autonomous self-driving vehicle 190 and positions the container 120 over the robotic shuttle vehicle 180. In FIG. 10D the extendable lift arm 200 lowers the container 120 on to the docking station 140 of the robotic shuttle vehicle 180. In FIG. 10E the extendable lift arm 200 separates, rises, and begins to retract back into the autonomous self-driving vehicle 190. In FIG. 10F the robotic shuttle vehicle 180 drives away to the automated transfer station 160 as described above to deposit the container 120. It is appreciated that in those inventive embodiments in which storage modules are leased to serve as a localized warehouse for subsequent deliveries, that the steps detailed in FIGS. 10A-10F are also operative to convey such goods to load, unload or both. It is further appreciated that a warehousing fee is readily paid for such warehousing storage.

Figures 11A, 11B, 11C, 11D, 11E, 11F:
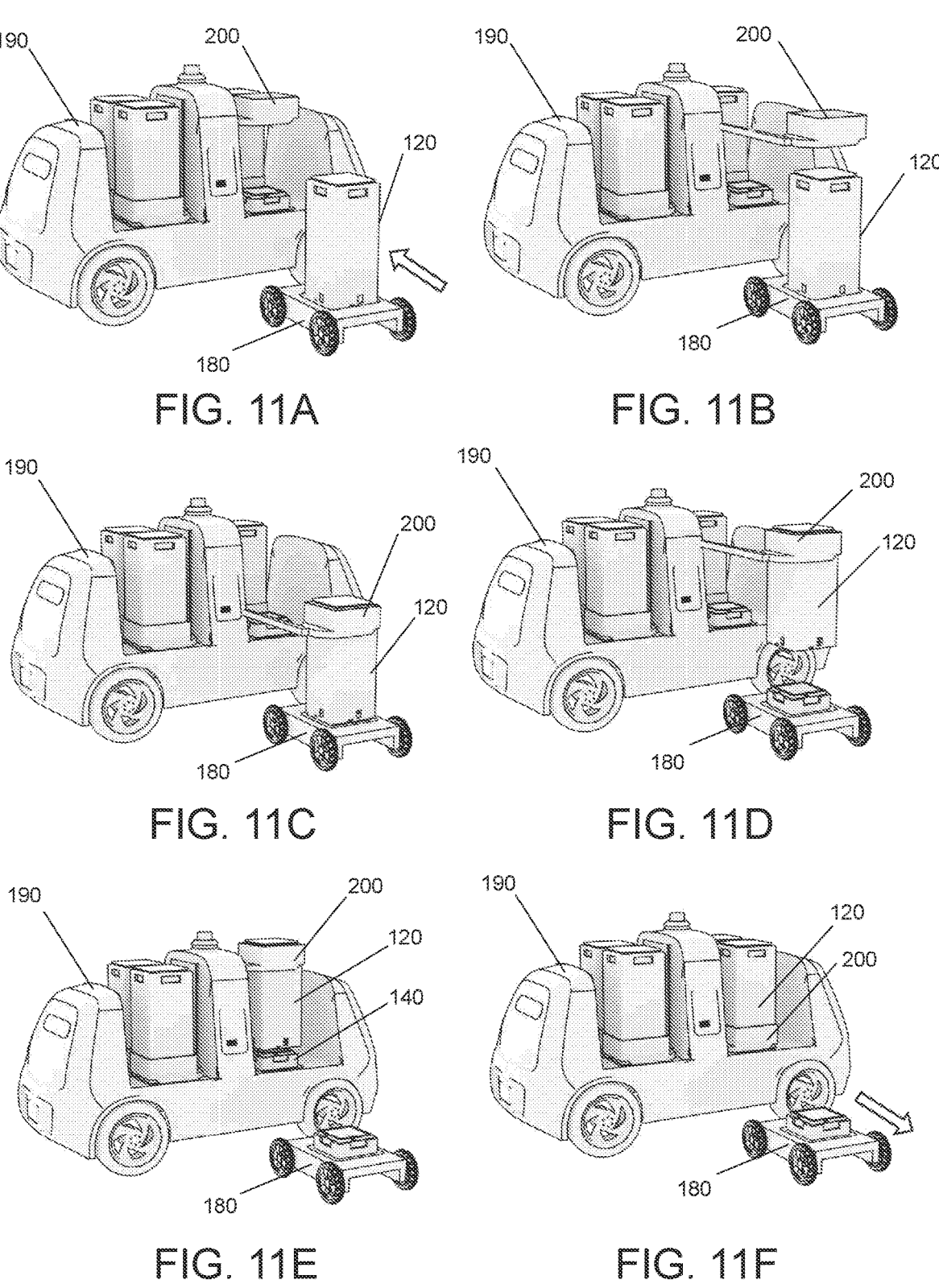
FIGS. 11A-11F are a series of views of the loading of containers to the autonomous vehicle of FIG. 9.

FIGS. 11A-11F are a series of views of the loading of containers 120 to the autonomous vehicle of FIG. 9. In FIG. 11A the robotic shuttle vehicle 180 is shown approaching the autonomous self-driving vehicle 190 loaded with a container 120 and positioning itself in front of an empty bay of the autonomous self-driving vehicle 190. In FIG. 11B an extendable lift arm 200 projects outward from the autonomous self-driving vehicle 190 and positions over the container 120 on the robotic shuttle vehicle 180. In FIG. 11C the extendable lift arm 200 lowers on to and attaches to the container 120. In FIG. 11D the extendable lift arm 200 lifts the container 120 from the robotic shuttle vehicle 180, and in FIG. 11E the extendable lift arm 200 retracts back into the autonomous self-driving vehicle 190 while holding the container 120. In FIG. 11F the container is fully lowered on to the docking station 140 of the autonomous self-driving vehicle 190, and the now empty robotic shuttle vehicle 180 drives away. It is appreciated that in those inventive embodiments in which storage modules are leased to serve as a localized warehouse for subsequent deliveries, that the steps detailed in FIGS. 11A-11F are also operative to convey such goods to load, unload or both. It is further appreciated that a warehousing fee is readily paid for such warehousing storage.

Figure 12A:
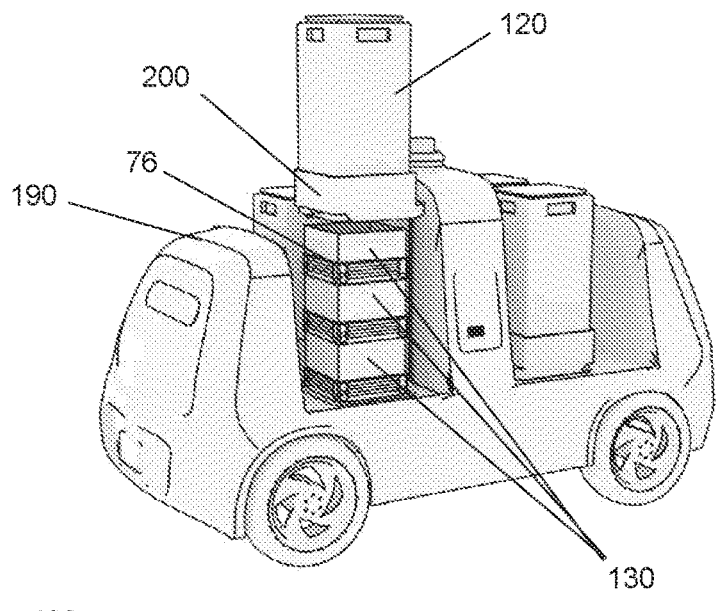
FIGS. 12A-12C are a series of views of the selection and presentation of open item trays for manual removal or placement to or from the autonomous vehicle of FIG. 9.
Figure 12B:
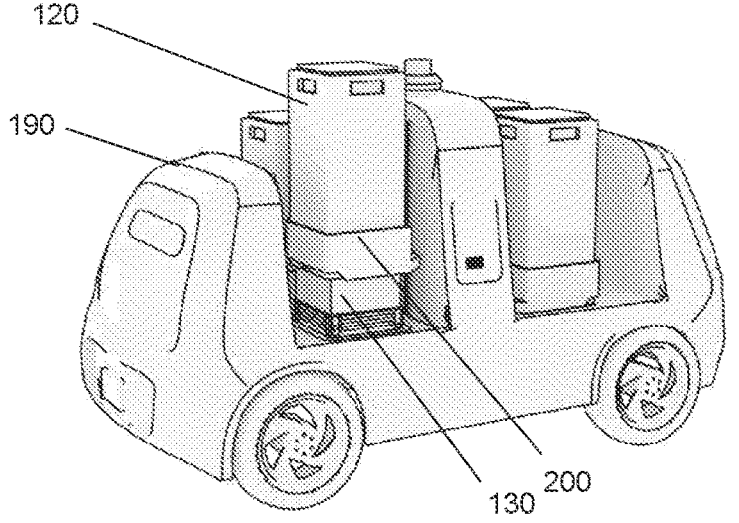
Figure 12C:
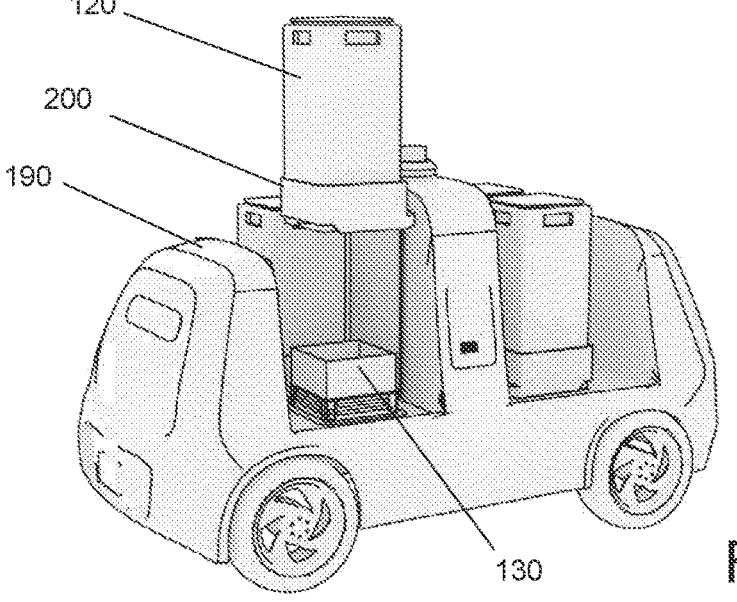

FIGS. 12A-12C are a series of views of the selection and unloading of item trays 130 from the autonomous vehicle 190 of FIG. 9. FIG. 12A shows a stack 76 of item trays 130, and FIG. 12B shows the selection of the top two item trays 130 from the stack 76, with only the bottom item tray 130 remaining on the docking station 140 in the bay of the autonomous vehicle 190 for manual access.

Figures 13A, 13B, 13C, 13D, 13E, 13F:
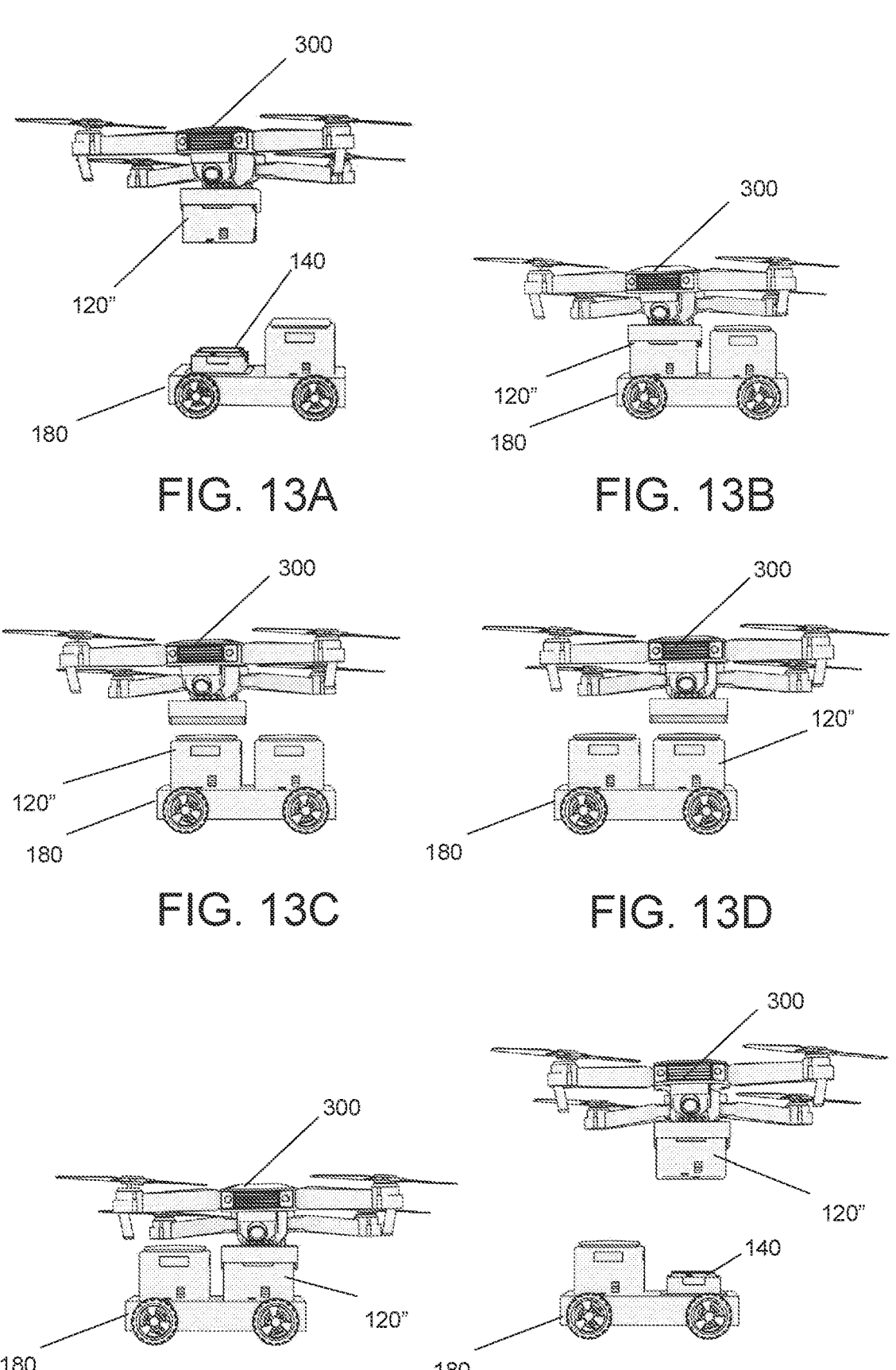
FIGS. 13A-13F illustrate an aerial drone delivering a delivery container and subsequently picking up a different delivery container from a robotic shuttle in accordance with embodiments of the invention.

FIGS. 13A-13F illustrate an aerial drone 300 delivering a delivery container 120″ and subsequently picking up a different delivery container 120″ from a robotic shuttle vehicle 180. The robotic shuttle vehicle 180 serves as an intermediary between the drone 300 and the automated transfer station 160. In FIG. 13A the drone 300 hovers over and aligns with the unoccupied docking station 140 of the robotic shuttle vehicle 180. Machine vision, target markings for alignment on the tops of the unoccupied docking station 140 and on the delivery container 120″ aid in alignment of the drone 300 with respect to the robotic shuttle vehicle 180. In FIG. 13B the drone 300 lowers the incoming delivery container 120″ on to the unoccupied docking station 140 and in FIG. 13C releases the delivery container 120″ and the drone 300 rises. In FIG. 13D the drone moves to hover and align with the previously occupied docking station in order to retrieve the delivery container 120″. In FIG. 13E the drone lowers and engages with the delivery container 120″, and in FIG. 13F the drone lifts off with the outgoing delivery container 120″. The scenario shown in FIGS. 13A-13F is representative of a package delivery and of the pickup of a return item. It is appreciated that in those inventive embodiments in which storage modules are leased to serve as a localized warehouse for subsequent deliveries, that the steps detailed in FIGS. 13A-13F are also operative to convey such goods to load, unload or both. It is further appreciated that a warehousing fee is readily paid for such warehousing storage.

Any patents or publications mentioned in this specification are herein incorporated by reference to the same extent as if each individual publication was specifically and individually indicated to be incorporated by reference.

The foregoing description is illustrative of particular embodiments of the invention but is not meant to be a limitation upon the practice thereof. The following claims, including all equivalents thereof, are intended to define the scope of the invention.

The invention claimed is:

1. A robotic receiving and disbursement system of items, the system comprising:

at least one of one or more vehicles or drones;

one or more transfer stations having one or more lift arms;

one or more robotic shuttles;

a stack of one or more item trays that each have only side walls and a base and support, protect, and facilitate automated picking and placing of the items and when the stack rests on the one or more robotic shuttles, the lowest of the one or more item trays of the stack in contact with the one or more robotic shuttles and the other trays of the stack interlocked therewith by complementary edge features that encircle an upper perimeter and a lower perimeter of each tray;

one or more containers that house and protect said one or more item trays and items;

one or more docking stations that secure said one or more containers to said one or more vehicles, said one or more transfer stations, and said one or more robotic shuttles, where said one or more robotic shuttles act as an interface for the items that are received or disbursed between said one or more vehicles or drones and said one or more transfer stations; and wherein said lift arms are adapted to handle transfer between said one or more vehicles, said one or more robotic shuttles, and said one or more transfer stations.

2. The system of claim 1 wherein said one or more docking stations provide attachment points to said one or more vehicles, said one or more robotic shuttles, and said one or more transfer stations, where said one or more docking stations further comprise a set of latches to retain each of said one or more containers.

3. The system of claim 1 wherein said one or more containers further comprise one or more of the following: an open bottom, a top with a set of sloped surfaces, a set of handles for human or robotic grasping, a set of latches to retain said one or more item trays, a set of slots to secure said one or more containers to said one or more docking stations, a set of compliant latch covers for environmental isolation, and interlocking features for stacking multiple containers.

4. The system of claim 1 wherein said one or more docking stations further comprise one or more of the following: a set of mounting features to secure to the ground, buildings or vehicles, locating interfaces for said one or more item trays and containers, a set of releasable latches to secure said containers, a pedestal to lift said one or more item trays off of the container latches to facilitate unlatching of said one or more item trays.

5. The system of claim 1 further comprising a suspended automation system that interfaces with said one or more transfer stations, said suspended automation system comprising:

a rail array secured to a ceiling;

a gantry;

a set of drive wheel modules coupled to said gantry for transit of said gantry in an area of said rail array;

a platform suspended from said gantry; and a plurality of storage modules located above said rail array, each of said plurality of storage modules having a volume for storage of one or more item trays and positioned within cells of said rail array;

wherein said platform delivers or retrieves said item trays from said transfer station to or from said plurality of storage modules, respectively.

6. The system of claim 5 wherein said set of drive wheel modules includes powered wheel modules.

7. The system of claim 6 wherein said wheel modules are pivotable between X and Y directions on said rail array.

8. The system of claim 5 further comprising one or more cameras associated with said platform.

9. The system of claim 5 further comprising one or more sensors associated with said rail array, said gantry, and or said platform.

10. The system of claim 5 further comprising cables between said gantry and platform, said cables being operated with winches in said gantry to raise and lower said platform.

11. The system of claim 5 further comprising a rotating platform on said platform of said gantry.

12. The system of claim 5 further comprising a human or computer user interface, said user interface is at least one of a display, touch screen tablet, auditory, smart phone, a joystick, or a combination thereof.

13. The system of claim 5 wherein the ceiling is part of a room or trellis.

14. The system of claim 5 further comprising a wall or door with a retractable panel to allow the gantry or shuttle to move between indoor and outdoor locations.

15. The system of claim 5 wherein at least two of said one or more item trays are stacked on one another forming a stack.

16. A process for the automated disbursement of one or more items in an indoor area to an outdoor location, said process comprising:

storing the one or more items in a system having a rail array secured to a ceiling, a gantry, a drive mechanism coupled to said gantry for transit of said gantry in an area of said rail array, a platform suspended from said gantry, a controller with a human or computer user interface for selectively moving said gantry, and a plurality of storage modules located above said rail array, each of said plurality of storage modules having a volume for storage of one or more item trays and are positioned within cells of said rail array;

requesting an item from said one or more items via the user interface;

allowing sufficient time for said gantry to translate to one of said plurality of said storage modules, said storage module therein containing the requested item;

retrieving from said storage module the one or more item trays;

lowering the one or more item trays preloaded with the one or more items; and moving the item or one or more item trays to a transfer station for retrieving the item or one or more item trays in the outdoor location.

17. The process of claim 16 further comprising:

providing one or more containers that support and protect said one or more item trays and items; and providing one or more docking stations that secure said one or more containers, trays, and items to one or more vehicles, one or more shuttles, and one or more transfer stations;

providing retractable lift arms and lift arms that are adapted to handle transfer of the containers, item trays, and items between one or more vehicles, one or more shuttles, and one or more transfer stations; and wherein said one or more transfer stations or vehicles facilitate automated reception and retrieval of an item from and or to a robotic shuttle vehicle.

18. The process of claim 17 further comprising disbursement of said one or more containers, trays, and items to said robotic shuttle vehicle.

19. The process of claim 17 wherein said robotic shuttle vehicle interacts with a vehicle or a drone where said vehicle or drone are equipped to secure said one or more containers, trays and items.

20. The process of claim 16 wherein said storing the one or more items is warehousing and said requesting an item from said one or more items is in response to a remote user request for delivery of the one or more items from said system.

\* \* \* \* \*